United States Patent
Bryll

(10) Patent No.: US 8,995,749 B2
(45) Date of Patent: Mar. 31, 2015

(54) ENHANCED EDGE DETECTION TOOL FOR EDGES OF IRREGULAR SURFACES

(71) Applicant: Mitutoyo Corporation, Kawasaki-shi, Kanagawa-ken (JP)

(72) Inventor: Robert Kamil Bryll, Bothell, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 209 days.

(21) Appl. No.: 13/852,945

(22) Filed: Mar. 28, 2013

(65) Prior Publication Data

US 2014/0294284 A1    Oct. 2, 2014

(51) Int. Cl.
  G06K 9/00    (2006.01)
  G06K 9/48    (2006.01)
  G06T 7/00    (2006.01)

(52) U.S. Cl.
  CPC ............. *G06T 7/0004* (2013.01); *G06T 7/0085* (2013.01)
  USPC ............................... 382/152; 382/199; 348/86

(58) Field of Classification Search
  USPC ...................... 382/141–152, 199; 348/86–95, 348/125–134; 356/237.1–237.6, 426–461
  See application file for complete search history.

(56) References Cited

U.S. PATENT DOCUMENTS

| | | | |
|---|---|---|---|
| 4,805,031 A | | 2/1989 | Powell |
| 5,729,622 A | * | 3/1998 | Csipkes et al. ................. 382/151 |
| 5,768,409 A | * | 6/1998 | Csipkes et al. ................. 382/151 |
| 5,790,710 A | | 8/1998 | Price et al. |
| 6,542,180 B1 | | 4/2003 | Wasserman et al. |
| 7,120,286 B2 | * | 10/2006 | Yu et al. ........................ 382/145 |
| 7,214,936 B2 | * | 5/2007 | Sato et al. ..................... 250/310 |
| 7,324,682 B2 | | 1/2008 | Wasserman |
| 7,454,053 B2 | | 11/2008 | Bryll et al. |
| 7,567,713 B2 | * | 7/2009 | Ding ............................. 382/199 |
| 7,627,162 B2 | * | 12/2009 | Blanford et al. .............. 382/141 |
| 7,973,282 B2 | * | 7/2011 | Sato et al. ..................... 250/311 |
| 8,030,614 B2 | * | 10/2011 | Sato et al. ..................... 250/311 |
| 8,111,905 B2 | | 2/2012 | Campbell |
| 8,111,938 B2 | | 2/2012 | Bryll et al. |
| 8,139,269 B2 | | 3/2012 | Goto et al. |
| 8,885,945 B2 | * | 11/2014 | Bryll et al. .................... 382/199 |
| 2004/0247172 A1 | * | 12/2004 | Mitsui ........................... 382/141 |

(Continued)

OTHER PUBLICATIONS

"QVPak 3D CNC Vision Measuring Machine User's Guide," published Jan. 2003, 330 pages.

(Continued)

*Primary Examiner* — Aaron W Carter
(74) *Attorney, Agent, or Firm* — Seed IP Law Group PLLC

(57) ABSTRACT

A method is provided for enhancing edge detection for edges of irregular surfaces in a machine vision inspection system. The inspection system comprises an edge feature video tool configured to determine profile data for an edge feature based on a plurality of differently focused images. An edge-referenced alignment compensation is provided related to substantially minimizing a respective offset amount of the edge feature at respective locations along a directional filtering direction used for directionally filtering the plurality of differently focused images prior to determining the profile data for the edge feature. In some embodiments, the plurality of differently focused images may be directionally filtered using a directional filtering sub region (DFS) defined relative to a point corresponding to a PFF basis pixel location in each of the plurality of images, each DFS having a relatively longer dimension along the directional filtering direction.

26 Claims, 14 Drawing Sheets

(56) References Cited

U.S. PATENT DOCUMENTS

| | | | |
|---|---|---|---|
| 2005/0035290 A1* | 2/2005 | Saitoh | 250/307 |
| 2006/0071166 A1* | 4/2006 | Sato et al. | 250/310 |
| 2008/0100832 A1* | 5/2008 | Sato et al. | 356/237.5 |
| 2008/0130982 A1* | 6/2008 | Kitamura et al. | 382/144 |
| 2009/0314938 A1* | 12/2009 | Sato et al. | 250/307 |
| 2011/0103679 A1* | 5/2011 | Campbell | 382/152 |
| 2012/0328181 A1* | 12/2012 | Kitamura et al. | 382/145 |
| 2014/0185910 A1* | 7/2014 | Bryll et al. | 382/141 |
| 2014/0294284 A1* | 10/2014 | Bryll | 382/152 |

OTHER PUBLICATIONS

"QVPAK 3D CNC Vision Measuring Machine Operation Guide," published Sep. 1996, 86 pages.

Geusebroek et al., "Robust Autofocusing in Microscopy," ISIS technical report series, vol. 17, Nov. 200, 20 pages.

Mahmood et al., "Nonlinear Approach for Enhancement of Image Focus Volume in Shape From Focus," IEEE Transactions on Image Processing, vol. 21, No. 5, May 2012, pp. 2866-2873.

U.S. Appl. No. 13/728,842, filed Dec. 27, 2012, entitled "Method for Improving Repeatability in Edge Location Results of a Machine Vision Inspection System," 48 pages.

* cited by examiner

ENHANCED EDGE DETECTION TOOL FOR EDGES OF IRREGULAR SURFACES

BACKGROUND

Precision machine vision inspection systems (or "vision systems" for short) can be utilized to obtain precise dimensional measurements of inspected objects and to inspect various other object characteristics. Such systems may include a computer, a camera and optical system, and a precision stage that is movable in multiple directions to allow workpiece inspection. One exemplary prior art system, that can be characterized as a general-purpose "off-line" precision vision system, is the commercially available QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, and the QVPAK 3D CNC Vision Measuring Machine Operation Guide, published September 1996, each of which is hereby incorporated by reference in their entirety. This type of system is able to use a microscope-type optical system and move the stage so as to provide inspection images of either small or relatively large workpieces at various magnifications.

General purpose precision machine vision inspection systems, such as the QUICK VISION™ system, are also generally programmable to provide automated video inspection. U.S. Pat. No. 6,542,180 (the '180 patent) teaches various aspects of such automated video inspection and is incorporated herein by reference in its entirety. As taught in the '180 patent, automated video inspection metrology instruments generally have a programming capability that allows an automatic inspection event sequence to be defined by the user for each particular workpiece configuration. This can be implemented by text-based programming, for example, or through a recording mode which progressively "learns" the inspection event sequence by storing a sequence of machine control instructions corresponding to a sequence of inspection operations performed by a user with the aid of a graphical user interface, or through a combination of both methods. Such a recording mode is often referred to as "learn mode" or "training mode" or "record mode." Once the inspection event sequence is defined in "learn mode," such a sequence can then be used to automatically acquire (and additionally analyze or inspect) images of a workpiece during "run mode."

The machine control instructions including the specific inspection event sequence (i.e., how to acquire each image and how to analyze/inspect each acquired image) are generally stored as a "part program" or "workpiece program" that is specific to the particular workpiece configuration. For example, a part program defines how to acquire each image, such as how to position the camera relative to the workpiece, at what lighting level, at what magnification level, etc. Further, the part program defines how to analyze/inspect an acquired image, for example, by using one or more video tools such as edge/boundary detection video tools.

Video tools (or "tools" for short) include GUI features and predefined image analysis operations such that operation and programming can be performed by non-expert operators. Video tools may be operated by a user to accomplish manual inspection and/or machine control operations (in "manual mode"). Their set-up parameters and operation can also be recorded during learn mode, in order to create automatic inspection programs. Exemplary video tools include edge location measurement tools, which are used to locate an edge feature of a workpiece, and which may include a tool configuration referred to as a "box tool" used to isolate an edge in a region of interest and then automatically determine the edge location. For example, commonly assigned U.S. Pat. No. 7,627,162, which is incorporated herein by reference in its entirety, teaches various applications of box tools.

Known edge location measurement tools use image intensity to determine edge locations. Intensity gradients are analyzed along scan lines (comprising pixel brightness or intensity values) that cross the edge. The maximum gradient location is frequently used as the edge location. However, it remains difficult to reliably locate "noisy" edges, such as the edges of irregular or highly textured surfaces or irregular edges produced by sawing or laser cutting, when using an intensity gradient method. The resulting scan lines are frequently too noisy to support reliable edge location measurements.

Another known type of video tool is sometimes referred to as a "multipoint tool" or a "multipoint autofocus tool" video tool. Such a tool provides Z-height measurements or coordinates (along the optical axis and focusing axis of the camera system) derived from a "best focus" position for a plurality of sub-regions at defined X-Y coordinates within a region of interest of the tool, such as determined by an contrast based "autofocus" method, sometimes referred to as a points from focus (PFF) reconstruction. A set of such X,Y,Z coordinates may be referred as point cloud data, or a point cloud, for short. In general, according to prior art autofocus methods and/or tools, the camera moves through a range of positions along a z-axis (the focusing axis) and captures an image at each position (referred to as an image stack). For each captured image, a focus metric is calculated for each sub-region based on the image and related to the corresponding position of the camera along the Z-axis at the time that the image was captured. This results in focus curve data for each sub-region, which may be referred to simply as a "focus curve" or "autofocus curve." The peak of the focus curve, which corresponds to the best focus position along the z-axis, may be found by fitting a curve to the focus curve data and estimating the peak of the fitted curve. Variations of such autofocus methods are well known in the art. For example, one known method of autofocusing similar to that outlined above is discussed in "Robust Autofocusing in Microscopy", by Jan-Mark Geusebroek and Arnold Smeulders in ISIS Technical Report Series, Vol. 17, November 2000. Another known autofocus method and apparatus is described in U.S. Pat. No. 5,790,710, which is hereby incorporated by reference in its entirety.

Some methods are known for post processing point cloud data and identifying edge features in the point cloud. However, such methods do not resemble the known intensity based edge location measurement tools outlined above (e.g. a box tool, or the like), in that the methods are considerably more complex to understand and apply and are generally not suitable for relatively unskilled users. In addition, certain issues may arise when determining a plurality of 3D data points across the surface of a workpiece and/or an edge, and attempting to use the resulting 3D data points together to determine the location or Z profile of the edge. Accuracies in the micron or sub-micron range are often desired in precision machine vision inspection systems. This is particularly challenging with regard to Z-height measurements around an edge. A particular problem arises in points from focus (PFF) reconstruction around an edge, in that the local contrast around each image pixel (corresponding to a point cloud X-Y location) is typically based on or averaged within a square neighborhood centered on that location (e.g. 7×7 pixels) to reduce noise in the contrast curve and to enable reliable Z depth reconstruction. However, in general, this distorts or "smoothes" the edge profile in the point cloud data, and reduces the accuracy and resolution of the profile across the edge. As a result, it remains difficult to determine an accurate profile and/or location for certain types of edges, for example "noisy" edges, such as the edges of irregular surfaces or irregular edges produced by sawing or laser cutting. Video tools and/or automatic operations that allow non-expert users to determine profiles for such edges with improved reliability and/or repeatability would be desirable.

DETAILED DESCRIPTION

Figure 1:
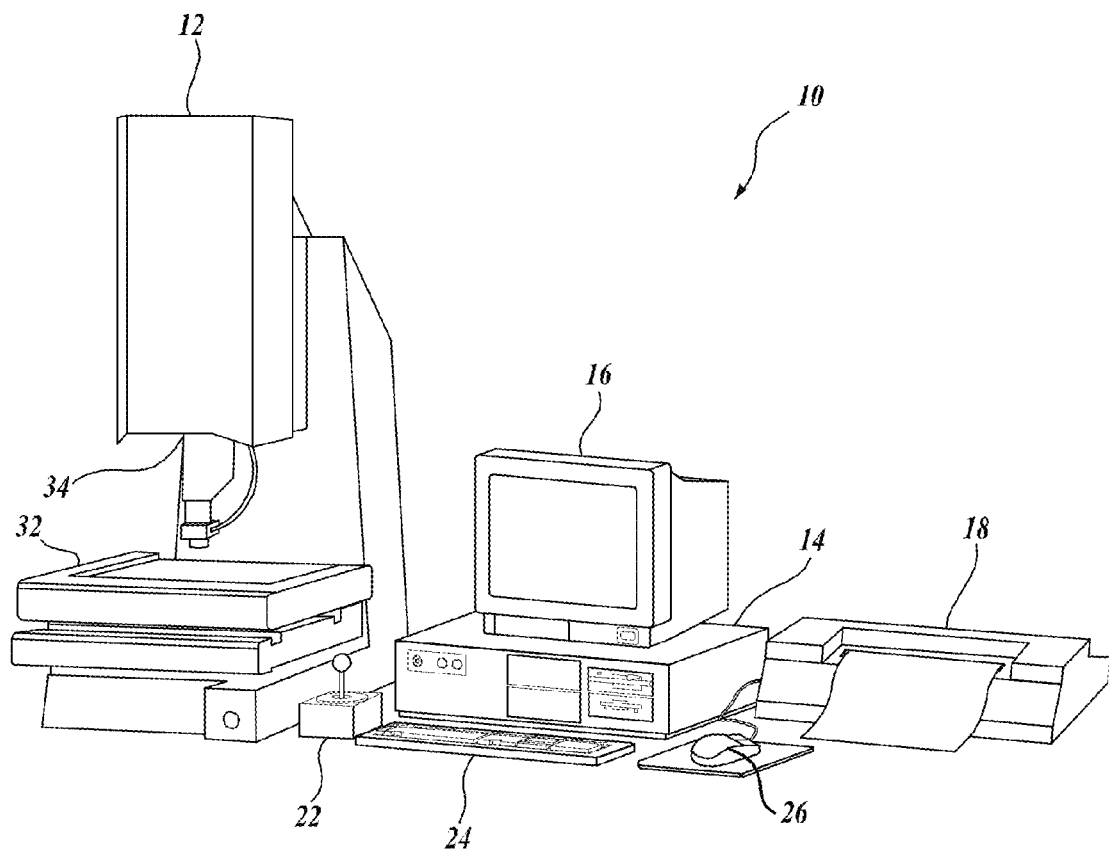
FIG. 1 is a diagram showing various typical components of a general purpose precision machine vision inspection system.

Disclosed herein is a method for enhancing edge detection for edges of irregular surfaces in a machine vision inspection system. The machine vision inspection system may comprise an edge feature video tool comprising a region of interest defining portion, wherein the edge feature video tool is configured to determine profile data for an edge feature in the region of interest based on a plurality of differently focused images of the region of interest. The method comprises placing a workpiece in a field of view of the machine vision inspection system, and operating the edge feature video tool to define a video tool region of interest including an edge feature in an acquired image of the workpiece. The edge feature video tool is operated to analyze image data of at least one workpiece image in the region of interest in order to provide an edge-referenced alignment compensation related to substantially minimizing a respective offset amount of the edge feature at respective locations along a directional filtering direction used for directionally filtering the plurality of differently focused images prior to determining the profile data for the edge feature. It will be understood that the edge-referenced alignment compensation is used to attempt to minimize or nearly minimize the respective offset amount(s) of the edge feature relative to the directional filtering direction. However, computational costs or the "noisiness" of the workpiece feature in the images, or both, may dictate a compromise in some embodiments that achieve this goal sufficiently, but not perfectly.

In various embodiments, the edge-referenced alignment compensation is usable to adjust the directional filtering direction such that the respective offset amount of the edge feature at respective locations along the directional filtering direction is at least one of a) substantially removed, b) substantially compensated, and c) substantially matched to a previously determined respective offset amount of a corresponding edge feature at respective locations along the directional filtering direction. It will be understood that adjusting the directional filtering direction may take various mathematical forms that achieve substantially the same result. In one form, the directional filtering direction may actually be adjusted to be as parallel as possible (or practical) to the edge feature. In another form, the respective offset amount of the edge feature at respective locations along the directional filtering direction may be used to adjust or compensate the relative addresses or locations of a default or generic set of pixel locations corresponding to a default or generic directional filtering direction, in effect rotating and/or resampling the image data such that pixel data aligned parallel to the edge feature are used in the directional filtering operation. These operations, which might be characterized as removing the offset amount in the first case, and compensating for the offset amount in the second case, have substantially similar results. Both may result in directional filtering operations that use pixel data that is aligned approximately parallel to an edge feature, such that it points along a nominal "constant height contour line" of the edge feature topography. If this condition is fulfilled, then a directionally filtered or averaged focus metric that provides a Z height determination proximate to the edge will be based on image data that should correspond to a small deviation in actual height, resulting in a more repeatable, accurate and representative Z height determination, as described in greater detail below. For this reason, any form of edge-referenced alignment compensation that provides substantially similar results may be referred to herein as, in effect, "adjusting the directional filtering direction".

In various embodiments, the edge feature video tool is operated to acquire the plurality of differently focused images. The edge-referenced alignment compensation is applied to adjust the directional filtering direction. The plurality of differently focused images are directionally filtered after applying the edge referenced alignment compensation. The profile data for the edge feature is determined based on the directionally filtered plurality of differently focused images.

In some embodiments, the directional filtering of the plurality of differently focused images may comprise using a directional filtering sub region (DFS) defined relative to a point corresponding to a PFF basis pixel location in each of the plurality of images, each DFS having a longer dimension along the directional filtering direction that is greater than a short dimension along a second direction approximately perpendicular to the directional filtering direction. The edge-referenced alignment compensation may be used to adjust the directional filtering direction such that the offset amount of the edge feature along the directional filtering direction is at least one of a) substantially removed and b) substantially compensated, prior to performing the directional filtering. In certain implementations, the short dimension is at most 5 pixels and the longer dimension is at least 3 times the second dimension. In certain implementations, a PFF metric used for determining a profile Z height associated with the PFF basis pixel location of a DFS is determined exclusively based on the pixels included in that DFS.

It will be appreciated that the utilization of a DFS with a longer dimension along the directional filtering direction provides advantages over prior methods in which only a square filtering sub region is utilized. More specifically, in traditional points from focus (PFF) reconstruction, the local contrast around each image pixel is averaged in a square filtering sub region (e.g. 7×7 pixels) to reduce noise in the contrast curve and to enable reliable Z depth reconstruction at the pixel location. The X-Y resolution of a reconstructed 3D depth map is thus reduced to the same degree in both X and Y directions by the square filtering sub regions. In contrast, by utilizing a DFS with a longer dimension along the directional filtering direction and a narrow dimension transverse to the longer dimension, the X-Y resolution may be selectively increased along the narrow direction, transverse to the directional filtering direction.

As a specific illustrative example, rather than utilizing a square filtering sub region (e.g. 7×7 pixels), a DFS with a longer dimension along the directional filtering direction (e.g. 49 pixels wide, 1 pixel high) may be utilized, which produces the same number of contrast values per pixel (e.g. 49), but with the Y (vertical) resolution increased to 1 pixel and the X resolution decreased based on the use of 49 pixels along that DFS direction. In one implementation, the averaging DFSs can be computed per-pixel as in a traditionally implemented PFF algorithm (e.g. multiple overlapping non-square averaging DFSs, with one DFS per pixel, and the point cloud X-Y location defined as the center of the DFS). In an alternative implementation, the profile reconstruction region (i.e. the PFF tool reconstruction region of interest) can be divided into non-square averaging sub regions, with one sub region per line or column of the profile reconstruction region.

The utilization of a directional filtering sub region technique as outlined above may produce relatively precise high resolution profiles ("cross-sections") across edge features and the like, in the direction that is along the narrow direction of the DFSs. However, a certain requirement must be fulfilled. The requirement is that the longer directional filtering direction should be aligned approximately parallel to an edge feature, such that it points along a nominal "constant height contour line" of the edge feature topography. If this condition is fulfilled, then the directionally filtered or averaged focus metric that provides the Z height determination for that DFS will be based on image data that should correspond to a small deviation in actual height, resulting in a more repeatable, accurate and representative Z height at the center of that DFS. In contrast, if this condition is not fulfilled, then the directionally filtered or averaged focus metric that provides the Z height determination for that DFS will be based on image data that is angled across the edge and therefore spans a large deviation of actual heights, producing in a less repeatable, less accurate, and possibly non-representative Z height at the center of that DFS.

It will be appreciated that, provided that the longer directional filtering direction is aligned approximately parallel to an edge feature, edge PFF techniques outlined above are particularly beneficial for certain applications, such as for determining accurate profiles and nominal locations for certain types of edges, for example "noisy" edges, such as the edges of irregular surfaces or irregular edges produced by sawing or laser cutting. In certain applications, to ensure that the longer directional filtering direction is aligned approximately parallel to an edge feature, edge-referenced alignment compensation may be provided, as will be described in more detail below. In certain embodiments, the edge-referenced alignment compensation may be automatically or semi-automatically provided, so that relatively unskilled users may obtain reliable measurements of noisy edges despite their lack of understanding of critical aspects of the process. In some embodiments, the edge-referenced alignment compensation may be included in the operations and/or user interface of an edge feature video tool or video tool mode that implements the PFF method to determine an edge location and/or edge profile.

In some embodiments, the edge feature video tool comprises a user interface including at least a region of interest indicator superimposed on an image of the workpiece, and the method further comprises providing an indication that the edge-referenced alignment compensation has been provided, by adjusting an element that is superimposed on the image of the workpiece in the user interface. In certain implementations, adjusting an element that is superimposed on the image of the workpiece in the user interface comprises one of changing a property of an element that is superimposed on the image of the workpiece, and adding an edge-referenced alignment compensation indicator superimposed on the image.

In some embodiments, adjusting an element that is superimposed on the image of the workpiece in the user interface comprises adjusting at least one of the region of interest indicator, an edge direction indicator, and a directional filtering direction indicator to indicate that the edge-referenced alignment compensation has been provided. It will be appreciated that in various specific implementations either the edge direction indicator or the direction filtering direction indicator may be a nominal edge shape line of the user interface.

In some embodiments, the edge feature video tool is configured corresponding to a straight edge feature and adjusting the region of interest indicator comprises positioning the region of interest indicator such that one of its axes is perpendicular to the edge feature, adjusting the edge direction indicator comprises positioning the edge direction indicator such that it is parallel to the edge feature, and adjusting the directional filtering direction indicator comprises positioning the directional filtering direction indicator such that it is one of parallel to or perpendicular to the edge feature. In certain other embodiments, the edge feature video tool is configured corresponding to one of a circular edge feature and a circular arc edge feature and adjusting the region of interest indicator comprises positioning the region of interest indicator such that its boundaries are approximately concentric with the edge feature, adjusting the edge direction indicator comprises positioning the edge direction indicator such that it is approximately concentric with the edge feature, and adjusting the directional filtering direction indicator comprises positioning the directional filtering direction indicator such that it is approximately concentric with the edge feature.

In various embodiments, the implementation of the method may comprise one of a) selecting the edge feature video tool such that it is a type that includes edge-referenced alignment compensation operations, b) selecting an edge-referenced alignment compensation mode or option of the edge feature video tool which includes edge-referenced alignment compensation operations, c) selecting a directional filtering mode or option of the edge feature video tool which includes edge-referenced alignment compensation operations, and d) selecting an edge-referenced alignment compensation tool that provides edge-referenced alignment compensation operations that operate in conjunction with the edge feature video tool. The analyzing of the image data of the at least one workpiece image in the region of interest in order to provide the edge-referenced alignment compensation may comprise executing the edge-referenced alignment compensation operations in conjunction with operations of the edge feature video tool.

In some cases, the method is performed during a learn mode of the machine vision system and corresponding operations are recorded in a part program. In other cases, at least some steps of the method are performed during a run mode of the machine vision system by executing corresponding operations recorded in a part program.

In some embodiments, providing the edge-referenced alignment compensation comprises characterizing the respective offset amount of the edge feature at respective locations along the directional filtering direction used for directionally filtering the plurality of differently focused images. In certain implementations, a look up table may be utilized to store the respective offset amounts corresponding to each respective location.

In some embodiments, characterizing the respective offset amount of the edge feature at respective locations along the directional filtering direction comprises: operating the edge feature video tool to acquire a plurality of differently focused images of the region of interest; determining preliminary profile data for the edge feature based on the acquired plurality of differently focused images of the region of interest; aligning a line shape associated with the edge feature video tool to the edge feature, based on the preliminary profile data; and characterizing the respective offset amount of the aligned line shape at respective locations along the directional filtering direction. In some such embodiments, the line shape associated with the edge feature video tool is a straight line, and characterizing the respective offset amount of the aligned line shape at respective locations along the directional filtering direction comprises determining an angle between the aligned straight line and the directional filtering direction. In some such embodiments, the line shape associated with the edge feature video tool comprises at least a portion of a circle, the directional filtering direction follows a direction parallel to a filtering direction circle, and characterizing the respective offset amount of the aligned line shape at respective locations along the directional filtering direction comprises determining the respective offset amount of the aligned at least a portion of a circle relative to the filtering direction circle.

In some embodiments, the method comprises operating the edge feature video tool to acquire a plurality of differently focused images of the region of interest during a learn mode of the machine vision system, and determining learn mode edge profiles at respective locations along the directional filtering direction based on the acquired plurality of differently focused images of the region of interest. Furthermore, providing the edge-referenced alignment compensation comprises determining a learn mode composite edge profile based on a plurality of contributing learn mode edge profiles that include a respective offset amount of a representative learn mode edge feature at respective locations along the directional filtering direction during learn mode, and operations corresponding to the method are stored in a part program including a stored representation of the learn mode composite edge profile. In some implementations, the method further comprises executing the part program during a run mode of the machine vision system, wherein the run mode comprises providing edge-referenced alignment compensation during the run mode based on determining a run mode composite edge profile based on a plurality of run mode contributing edge profiles. The profiles include the respective offset amount of a run mode edge feature corresponding to the representative learn mode edge feature at respective locations along the directional filtering direction during the run mode, wherein the run mode directional filtering direction is adjusted based on approximately maximizing a match of the run mode composite edge profile to the learn mode composite edge profile. In some such embodiments, the learn mode directional filtering direction is adjusted during learn mode such that a profile gradient corresponding to the representative edge feature in the learn mode composite edge profile is approximately maximized.

Various embodiments of the invention are described below. The following description provides specific details for a thorough understanding and an enabling description of these embodiments. One skilled in the art will understand, however, that the invention may be practiced without many of these details. In addition, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 is a block diagram of one exemplary machine vision inspection system 10 usable in accordance with methods described herein. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10.

Those skilled in the art will appreciate that the controlling computer system 14 may generally consist of any computing system or device. Suitable computing systems or devices may include personal computers, server computers, minicomputers, mainframe computers, distributed computing environments that include any of the foregoing, and the like. Such computing systems or devices may include one or more processors that execute software to perform the functions described herein. Processors include programmable general-purpose or special-purpose microprocessors, programmable controllers, application specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic or optical based disks, flash memory devices, or any other type of non-volatile storage medium for storing data. Software may include one or more program modules which include routines, programs, objects, components, data structures, and so on that perform particular tasks or implement particular abstract data types. In distributed computing environments, the functionality of the program modules may be combined or distributed across multiple computing systems or devices and accessed via service calls.

The vision measuring machine 12 includes a moveable workpiece stage 32 and an optical imaging system 34 which may include a zoom lens or interchangeable lenses. The zoom lens or interchangeable lenses generally provide various magnifications for the images provided by the optical imaging system 34. The machine vision inspection system 10 is generally comparable to the QUICK VISION® series of vision systems and the QVPAK® software discussed above, and similar state-of-the-art commercially available precision machine vision inspection systems. The machine vision inspection system 10 is also described in commonly assigned U.S. Pat. Nos. 7,454,053, 7,324,682, 8,111,905, and 8,111,938, which are each incorporated herein by reference in their entireties.

Figure 2:
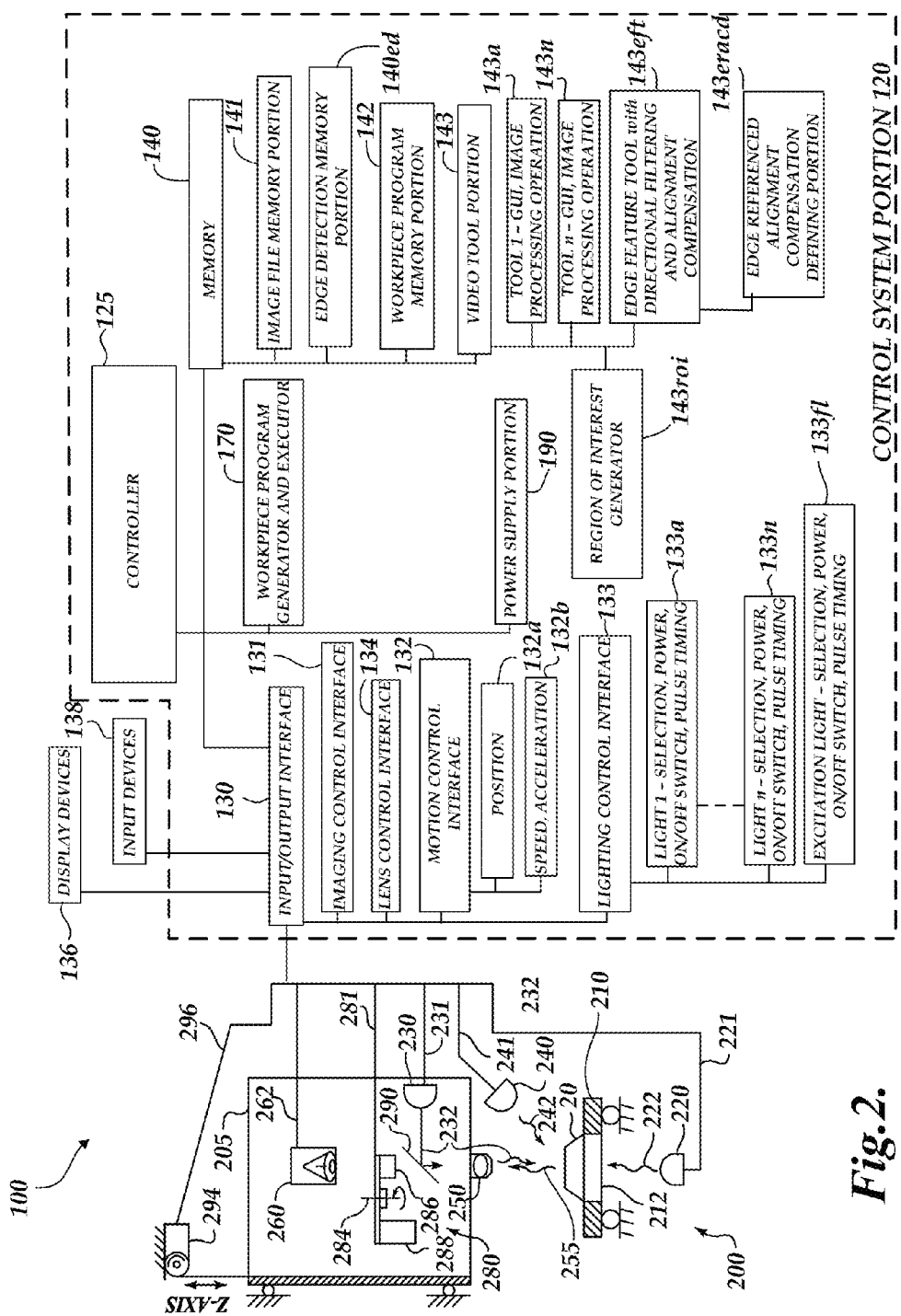
FIG. 2 is a block diagram of a control system portion and a vision components portion of a machine vision inspection system similar to that of FIG. 1, and including an edge feature tool including a PFF method with directional filtering and alignment compensation.

FIG. 2 is a block diagram of a control system portion 120 and a vision components portion 200 of a machine vision inspection system 100 similar to the machine vision inspection system 10 of FIG. 1. As will be described in more detail below, the control system portion 120 is utilized to control the vision components portion 200. The vision components portion 200 includes an optical assembly portion 205, light sources 220, 230, and 240, and a workpiece stage 210 having a central transparent portion 212. The workpiece stage 210 is controllably movable along X and Y axes that lie in a plane that is generally parallel to the surface of the stage where a workpiece 20 may be positioned. The optical assembly portion 205 includes a camera 260, a beam splitter 291, an interchangeable objective lens 250, and may include a turret lens assembly 280 having lenses 286 and 288. Alternatively to the turret lens assembly, a fixed or interchangeable magnification-altering lens, or a zoom lens configuration, or the like, may be included. An interchangeable lens may be interchanged manually or automatically.

The optical assembly portion 205 is controllably movable along a Z-axis that is generally orthogonal to the X and Y axes, by using a controllable motor 294 that drives an actuator to move the optical assembly portion 205 along the Z-axis to change the focus of the image of the workpiece 20. The controllable motor 294 is connected to the input/output interface 130 via a signal line 296.

A workpiece 20, or a tray or fixture holding a plurality of workpieces 20, which is to be imaged using the machine vision inspection system 100 is placed on the workpiece stage 210. The workpiece stage 210 may be controlled to move relative to the optical assembly portion 205, such that the interchangeable objective lens 250 moves between locations on a workpiece 20, and/or among a plurality of workpieces 20. One or more of a stage light 220, a coaxial light 230, and a surface light 240 (e.g. a ring light) may emit source light 222, 232, and/or 242, respectively, to illuminate the workpiece or workpieces 20. The light source 230 may emit light 232 along a path including a mirror 290. The source light is reflected or transmitted as workpiece light 255, and the workpiece light used for imaging passes through the interchangeable objective lens 250 and the turret lens assembly 280 and is gathered by the camera 260. The images of the workpiece(s) 20, from the camera 260, are output on a signal line 262 to the control system portion 120. The light sources 220, 230, and 240 may be connected to the control system portion 120 through signal lines or busses 221, 231, and 241, respectively. To alter the image magnification, the control system portion 120 may rotate the turret lens assembly 280 along axis 284 to select a turret lens, through a signal line or bus 281.

As shown in FIG. 2, in various exemplary embodiments, the control system portion 120 includes a controller 125, the input/output interface 130, a memory 140, a workpiece program generator and executor 170, and a power supply portion 190. Each of these components, as well as the additional components described below, may be interconnected by one or more data/control buses and/or application programming interfaces, or by direct connections between the various elements.

The input/output interface 130 includes an imaging control interface 131, a motion control interface 132, a lighting control interface 133, and a lens control interface 134. The motion control interface 132 may include a position control element 132a, and a speed/acceleration control element 132b although such elements may be merged and/or indistinguishable. The lighting control interface 133 includes lighting control elements 133a-133n, and 133fl which control, for example, the selection, power, on/off switch, and strobe pulse timing if applicable, for the various corresponding light sources of the machine vision inspection system 100.

The memory 140 may include an image file memory portion 141, a workpiece program memory portion 142 that may include one or more part programs, or the like, and a video tool portion 143. As illustrated, the video tool portion 143 includes representative video tool portions 143a and 143n, which determine the GUI, image processing operation, etc., for each of the corresponding video tools. Also, the video tool portion 143 may include, in particular, an edge feature tool with directional filtering and alignment compensation 143eft as described in greater detail below, which may include edge profile determining operations described with respect to a "box tool" and an "arc tool", in the QVPAK 3D CNC Vision Measuring Machine Operation Guide, for example, and which may incorporate signal processing to implement the methods disclosed herein. The edge feature tool with directional filtering and alignment compensation 143eft may include an edge referenced alignment compensation defining portion 143eracd that automatically or semi-automatically determines the desired compensation, as will be described in more detail below. The video tool portion 143 also includes a region of interest (ROI) generator 143roi that supports automatic, semi-automatic and/or manual operations that define various ROIs that are operable in various video tools included in the video tool portion 143. In some embodiments, the edge feature tool with directional filtering and alignment compensation 143eft may operate in conjunction with, or to supplement the operation of, the region of interest (ROI) generator 143roi in order to adjust an initial orientation or position of the region of interest, to align a video tool region of interest with an edge feature to improve repeatability of edge location measurements, as described in greater detail below.

In the context of this disclosure, and as known by one of ordinary skill in the art, the term video tool generally refers to a relatively complex set of automatic or programmed operations that a machine vision user can implement through a relatively simple user interface (e.g. a graphical user interface, editable parameter windows, menus, and the like), without creating the step-by-step sequence of operations included in the video tool or resorting to a generalized text-based programming language, or the like. For example, a video tool may include a complex pre-programmed set of image processing operations and computations which are applied and customized in a particular instance by adjusting a few variables or parameters that govern the operations and computations. In addition to the underlying operations and computations, the video tool comprises the user interface that allows the user to adjust those parameters for a particular instance of the video tool. For example, many machine vision video tools allow a user to configure a graphical region of interest (ROI) indicator through simple "handle dragging" operations using a mouse, in order to define the location parameters of a subset of an image that is to be analyzed by the image procession operations of a particular instance of a video tool. It should be noted that the visible user interface features are sometimes referred to as the video tool, with the underlying operations being included implicitly.

In common with many video tools and/or video tool features and operations, the directional filtering and edge referenced alignment compensation subject matter of this disclosure includes both user interface features and underlying image processing operations, and the like, and the related features may be characterized as features of an edge feature video tool with or including directional filtering and alignment compensation 143eft that is included in the video tool portion 143. The edge feature tool with directional filtering and alignment compensation 143eft provides operations which may be used to automatically provide directional filtering and edge referenced alignment compensation for determining a profile of an edge feature to improve the repeatability of related edge profile determining operations.

Various tool parameters and/or offset characterizations determined during learn mode operations of the edge feature tool 143eft may be determined and stored in a part program during learn mode, as described in greater detail below. The video tool portion 143 may also, or instead, include a conventional edge measurement video tool which operates according to known edge detection or location methods. In one embodiment, the edge referenced alignment compensation defining portion 143eracd may be linked or otherwise act in conjunction with such a tool. For example, in one embodiment, the directional filtering and edge referenced alignment compensation operations disclosed herein may be included as a directional filtering and edge referenced alignment compensation mode in a multi-mode edge profile tool that includes modes comparable to the known edge tools (e.g. a known box tool, arc tool, circle tool, etc.). In some embodiments, the edge feature tool with directional filtering and alignment compensation 143eft and the known or conventional edge tool(s) may be separate tools, but in some embodiments they may be two modes of a single edge tool. In some embodiments where they are two modes of a single edge tool, the particular mode may be chosen by the edge tool based on manual and/or automatic learn mode operations (e.g. based on how irregular or noisy the edge is, and/or whether its nominal shape is known), as described further below.

The signal lines or busses 221, 231 and 241 of the stage light 220, the coaxial lights 230 and 230', and the surface light 240, respectively, are all connected to the input/output interface 130. The signal line 262 from the camera 260 and the signal line 296 from the controllable motor 294 are connected to the input/output interface 130. In addition to carrying image data, the signal line 262 may carry a signal from the controller 125 that initiates image acquisition.

One or more display devices 136 (e.g., the display 16 of FIG. 1) and one or more input devices 138 (e.g., the joystick 22, keyboard 24, and mouse 26 of FIG. 1) can also be connected to the input/output interface 130. The display devices 136 and input devices 138 can be used to display a user interface, which may include various graphical user interface (GUI) features that are usable to perform inspection operations, and/or to create and/or modify part programs, to view the images captured by the camera 260, and/or to directly control the vision system components portion 200.

In various exemplary embodiments, when a user utilizes the machine vision inspection system 100 to create a part program for the workpiece 20, the user generates part program instructions by operating the machine vision inspection system 100 in a learn mode to provide a desired image acquisition training sequence. For example a training sequence may comprise positioning a particular workpiece feature of a representative workpiece in the field of view (FOV), setting light levels, focusing or autofocusing, acquiring an image, and providing an inspection training sequence applied to the image (e.g. using an instance of one of the video tools on that workpiece feature). The learn mode operates such that the sequence(s) are captured or recorded and converted to corresponding part program instructions. These instructions, when the part program is executed, will cause the machine vision inspection system to reproduce the trained image acquisition and inspection operations to automatically inspect that particular workpiece feature (that is the corresponding feature in the corresponding location) on a run mode workpiece or workpieces which matches the representative workpiece used when creating the part program.

Figure 3:
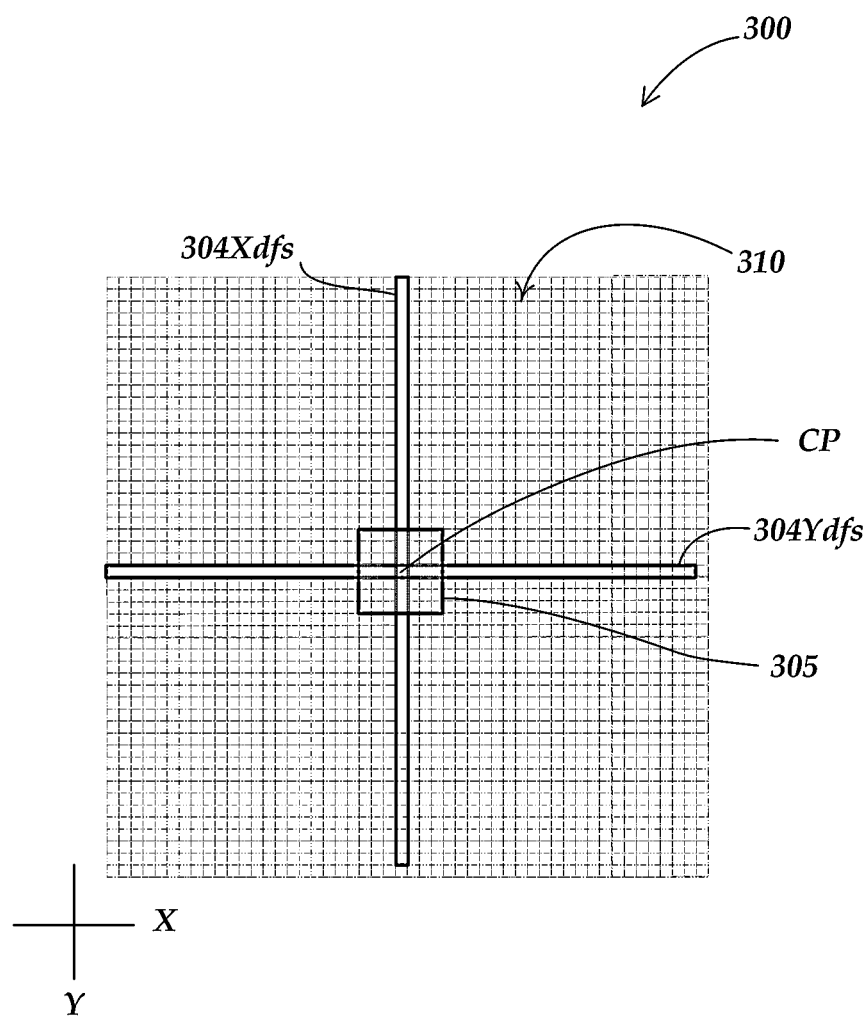
FIG. 3 is a diagram showing a square filtering sub region and directional filtering sub regions (DFS).

FIG. 3 is a diagram 300 showing a square filtering sub region 305 and alternative directional filtering sub regions 304Ydfs and 304Xdfs, overlaying an array of image pixels (or pixel locations) 310 (e.g. corresponding to a portion of a region of interest in an image). As will be described in more detail below, an edge feature video tool may be provided for determining profile data and/or a location for an edge feature (e.g. utilizing points from focus techniques.) In traditional points from focus (PFF) reconstruction, the local contrast around each image pixel is averaged in a square sub region (e.g. square sub region 305.) The square filtering sub region (e.g. 7×7 pixels) is utilized to reduce noise in the contrast curve and to enable reliable Z depth reconstruction at the pixel location. The X-Y resolution of a reconstructed 3D depth map is thus reduced to the same degree in both X and Y directions by the square filtering sub regions. In contrast, as will be described in more detail below, by utilizing a directional filtering sub region (DFS) with one dimension longer than the other, the X-Y resolution may be selectively increased or retained along one narrower direction. As specific examples, as shown in FIG. 3, a DFS 304Ydfs (e.g. 49 pixels wide, 1 pixel high) may be utilized for good profiling resolution with respect to the Y direction (that is, for a Z height profile running along the Y direction), and a DFS 304Xdfs (e.g. 49 pixels high, 1 pixel wide) may be utilized for good profiling resolution with respect to the X direction (that is, for a Z height profile running along the X direction).

It will be appreciated that the DFS 304Ydfs (for Y direction profiling) and the DFS 304Xdfs (for X direction profiling) have the same area as the square sub region 305, but with one dimension being much narrower than the other, thus providing the same amount of pixel data for determining a focus metric while also providing better profiling resolution along that narrower direction. In one implementation, the Z depth is computed for each DFS utilizing a known type of PFF operation within the DFS, and assigned as the Z coordinate at the location of the central pixel CP of the DFS, which has an X-Y location corresponding to the point cloud X-Y coordinate.

In some embodiments, the Z depths corresponding to a selected number of point cloud X-Y pixel locations that are adjacent to one another along the direction of the longer dimension of their DFSs may then also be averaged to further improve the repeatability of a Z depth profile and/or edge location along the direction of the narrow dimension. Along these lines, in one embodiment directional filtering operations may be described as determining a Z height for "children" DFSs that are part of and shorter than a parent DFS (e.g. 7, 9, 11 pixels, etc.), and averaging the Z heights of the children DFSs to determine the overall Z height of the parent DFS. Further along these lines, in one embodiment directional filtering operations may be described as determining a focus metric for "children" DFSs that are part of and shorter than a parent DFS (e.g. 7, 9, 11 pixels, etc.) in each image of a PFF stack, and averaging the focus metrics or the computed Z depth of the children DFSs to determine the overall focus metric or the average Z depth of the parent DFS, and determining a Z height based on the resulting averaged focus metrics (focus curve) or the average Z depth of the parent DFS. It will be appreciated that in general such types of averaging further smoothes the Z height profile along the direction of the longer dimension of DFSs, which may be thought of as degrading the profile resolution along that direction. However, in many edge measurement applications, this is irrelevant.

Figure 4B:
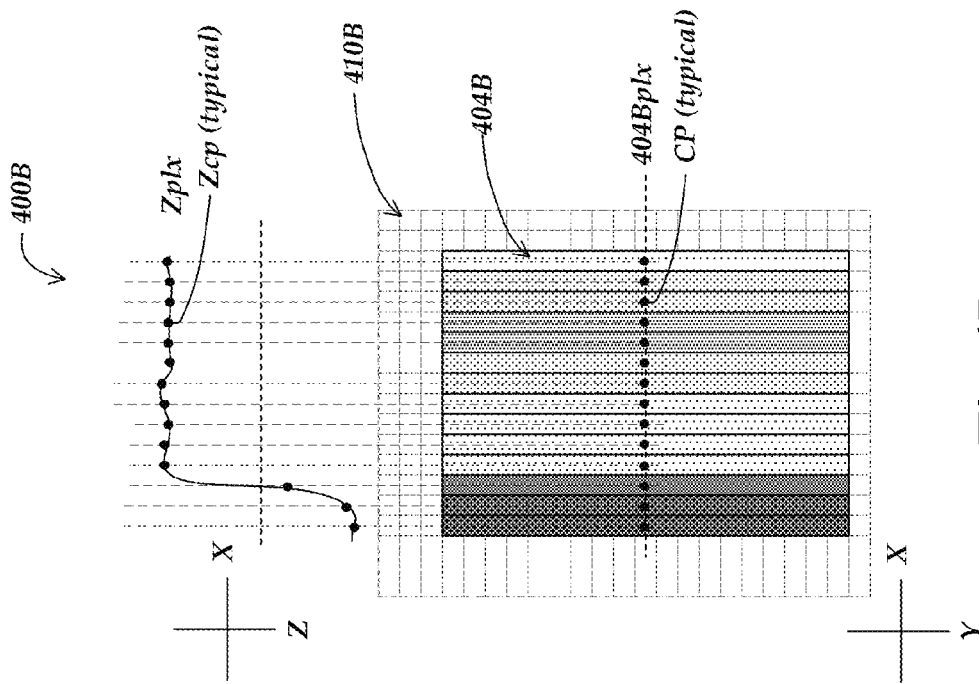
FIGS. 4A and 4B are diagrams showing directional filtering sub regions utilized for PFF profiling across horizontal and vertical features.
Figure 4A:
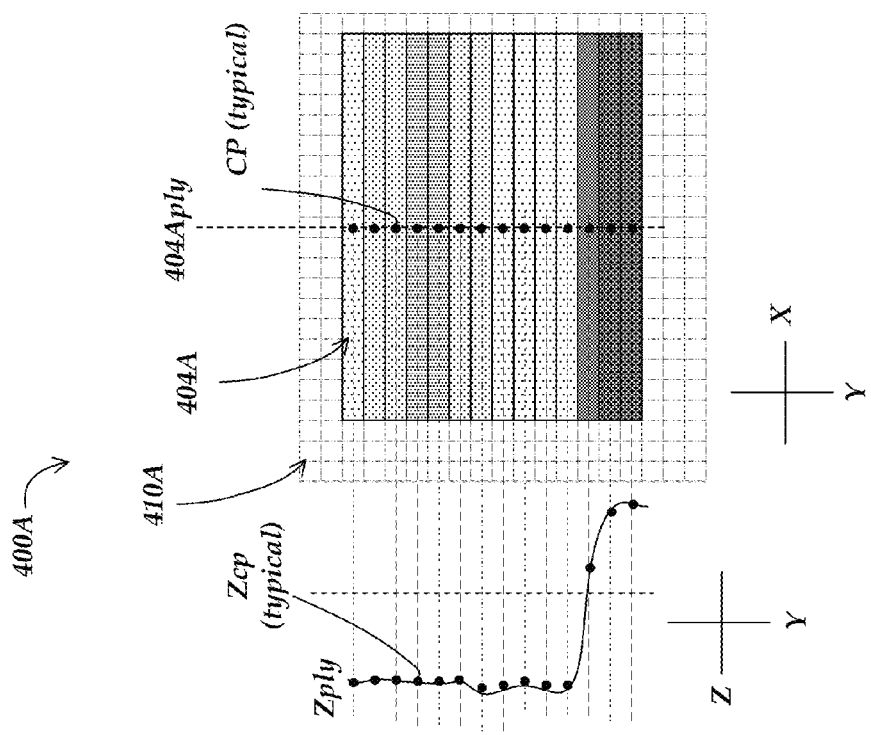

FIGS. 4A and 4B are diagrams 400A and 400B clarifying the application of directional filtering sub regions utilized for profiling and/or locating horizontal and vertical edges.

FIG. 4A shows a set of DFSs 404A overlaying an array of image pixels (or pixel locations) 410A (e.g. corresponding to a portion of a region of interest in an image). The shading in the set of DFSs 404A schematically represents the imaged surface structure of the underlying workpiece, depicting a surface that exhibits "horizontal" surface features (e.g. a horizontal edge) that have a variable height along the Y direction, and a relatively constant height along the X direction. The DFSs are determined such that their longer dimension is approximately parallel to the horizontal surface features, for reasons previously outlined with reference to FIG. 3. Thus, each DFS of the set 404A may be understood to be analogous to the DFS 304Ydfs previously outlined with reference to FIG. 3 (e.g. having a relatively longer X dimension and relatively narrower Y dimension), and may provide a relatively high resolution Z profile along the Y direction across the surface features. The X-Y coordinates for each DFS in the set may correspond to their central pixels or points CP. Thus, the Z coordinates Zcp determined for each DFS (based on known PFF contrast or focus curve methods, for example) may fall along the Y direction profile line 404Aply.

FIG. 4A also illustrates a Z profile Zply, that is, a Z profile along the Y direction across the horizontal surface features. The Z profile Zply comprises the surface heights Zcp determined for each of the DFSs in the set 404A, which may be used as corresponding point cloud Z coordinates. It will be understood that if a Z profile along the Y direction across the surface features were desired for location one pixel (or N pixels) to the left of the location of the Y direction profile line 404Aply, then a set of DFSs analogous to the set 404A could be shifted to the left by one pixel (or N pixels), and the procedure outlined above could be performed for that set. In this manner, a Z height can be determined for every pixel location in a video tool region of interest, if desired. It will be appreciated that if desired, that longer dimension of a DFS may extend the full width of an ROI, if the horizontal features to be profiled and/or located extend the full width of the ROI. Alternatively, under these conditions, Z coordinates can be averaged for a desired group of adjacent DFSs along the X direction, and that averaged Z coordinate used as the Z coordinate at the center of the averaged group, if desired.

FIG. 4B is analogous to FIG. 4A, except that the relevant surface features are vertical rather than horizontal. It shows a set of DFSs 404B overlaying an array of image pixels (or pixel locations) 410B (e.g. corresponding to a portion of a region of interest in an image). The shading in the set of DFSs 404B schematically represents the imaged surface structure of the underlying workpiece, depicting a surface that exhibits "vertical" surface features (e.g. a vertical edge) that have a variable height along the X direction, and a relatively constant height along the Y direction. The DFSs are determined such that their longer dimension is approximately parallel to the vertical surface features. Thus, each DFS of the set 404B may be understood to be analogous to the DFS 304Xdfs previously outlined with reference to FIG. 3, and may provide a relatively high resolution Z profile along the X direction across the surface features. The X-Y coordinates for each DFS in the set may correspond to their central pixels or points CP. Thus, the Z coordinates Zcp determined for each DFS may fall along the X direction profile line 404Bplx.

FIG. 4B also illustrates a Z profile Zplx, that is, a Z profile along the X direction across the vertical surface features. The Z profile Zplx comprises the surface heights Zcp determined for each of the DFSs in the set 404B. It will be understood that if a Z profile along the X direction across the surface features were desired for location N pixels above or below the location of the X direction profile line 404Bplx, then a set of DFSs analogous to the set 404B could be shifted appropriately and the procedure outlined above could be performed for that set. In this manner, a Z height can be determined for every pixel location in a video tool region of interest, if desired. It will be appreciated that if desired, that longer dimension of a DFS may extend the full height of an RO, if the vertical features to be profiled and/or located extend the full width of the ROI. Alternatively, under these conditions, Z coordinates can be averaged for a desired group of adjacent DFSs along the Y direction, and that averaged Z coordinate used as the Z coordinate at the center of the averaged group, if desired.

Figure 5:
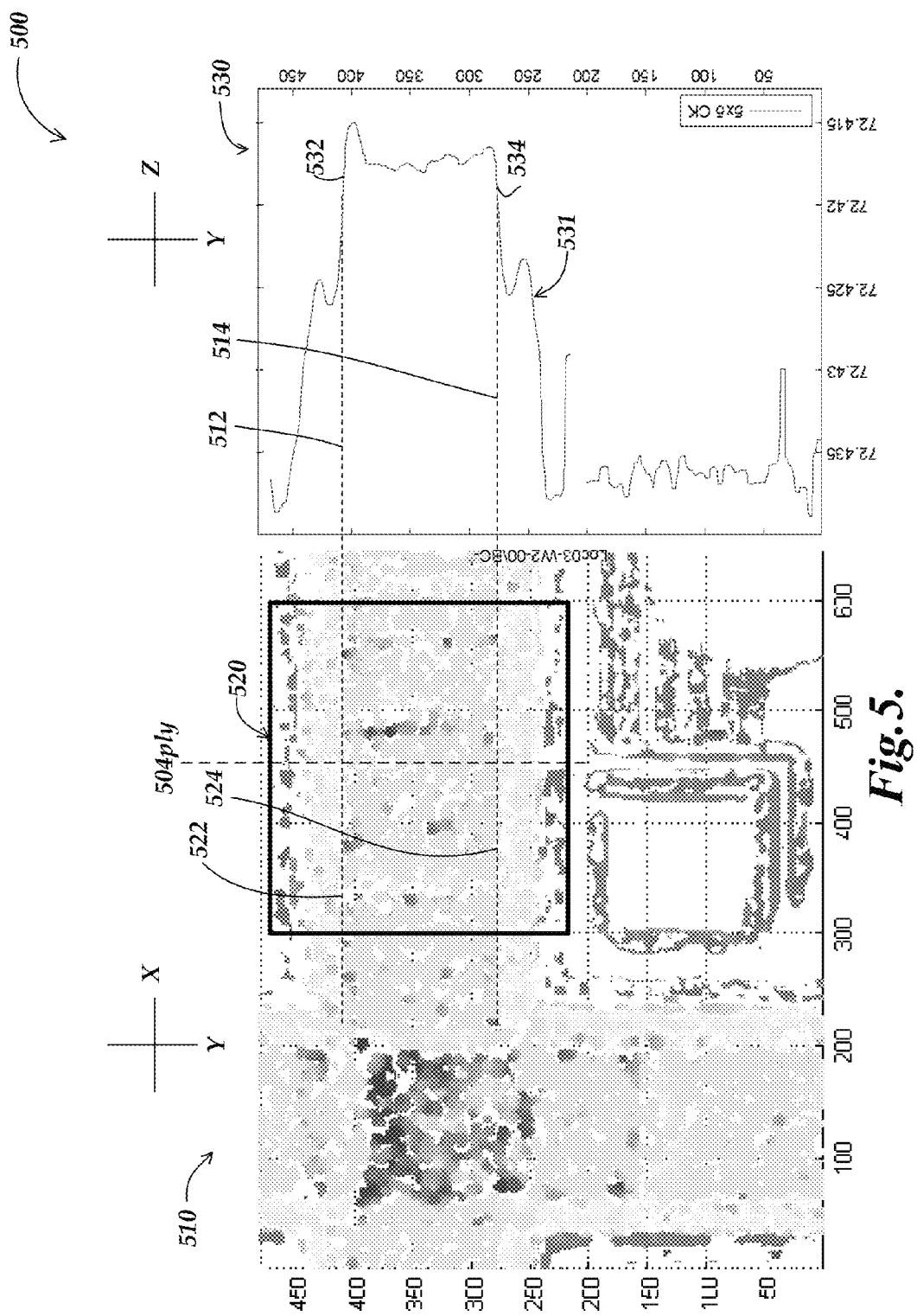
FIG. 5 is a diagram showing a depth map reconstructed using a PFF algorithm with square filtering sub regions for each pixel.
Figure 6:
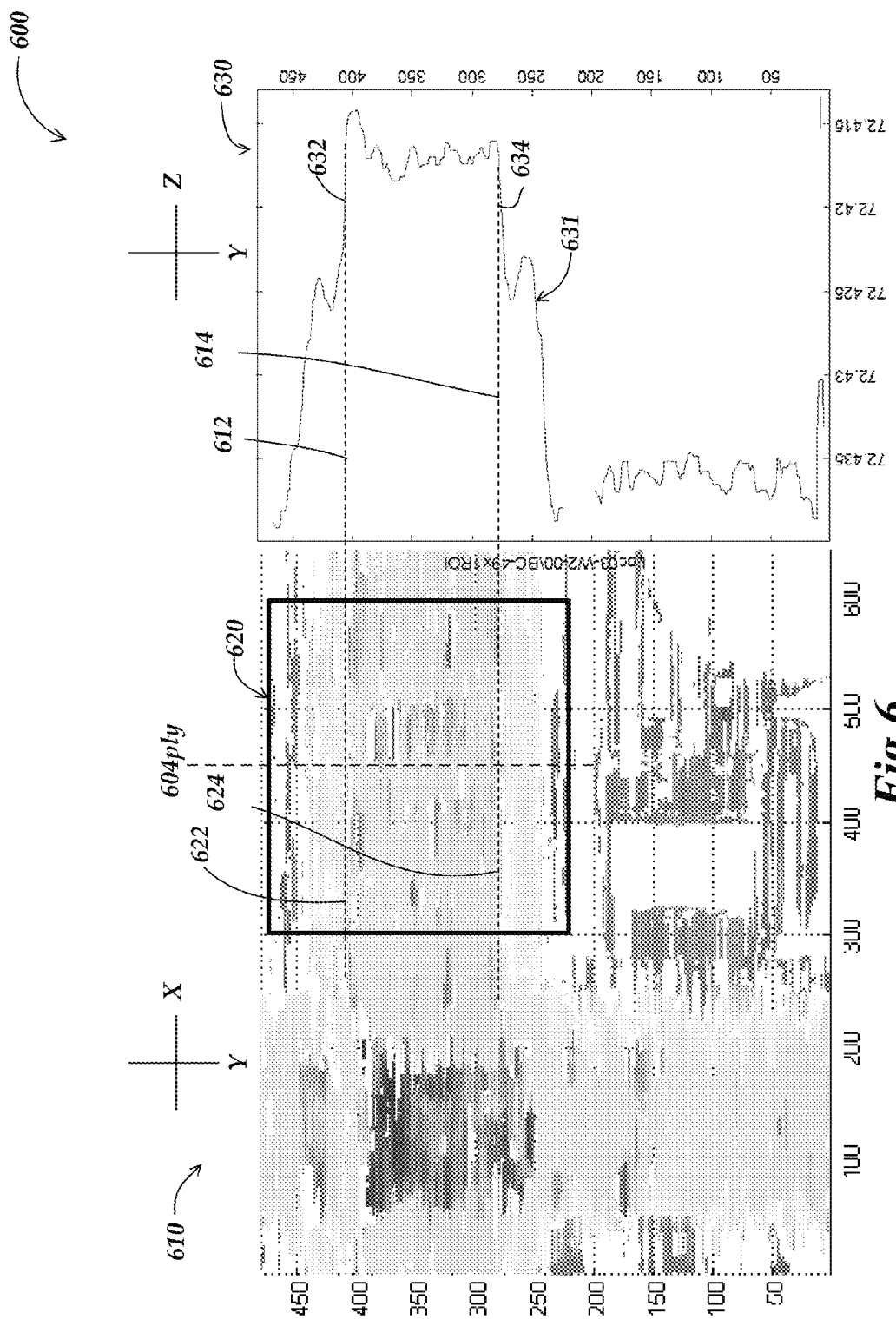
FIG. 6 is a diagram showing a depth map reconstructed using a PFF algorithm with directional filtering sub regions (DFS) for each pixel.

FIG. 5 shows the results of conventional PFF operations for comparison to FIG. 6, which shows the results of a directionally filtered PFF method that is preferred for the edge profiling and/or locating systems and methods disclosed herein. FIG. 5 is a diagram 500 showing a profile or depth map 510 reconstructed using a known PFF method with square filtering sub regions for each pixel. The different shadings or colors in the map 510 are indicative of rough or noisy surfaces and edges, and the white areas of the map indicated regions where the data and/or the surface is deemed too irregular or noisy to determine a reliable height at that location. A profile reconstruction region 520 (e.g. a ROI of a video tool) and a corresponding Z profile 531 in a window 530 are also illustrated. The profile reconstruction region 520 is shown to include edge features 522 and 524, which are examples of "noisy" edges of a horizontal groove (e.g. such as the edges of irregular surfaces or irregular edges produced by sawing or laser cutting across a substrate.) The edge features 522 and 524 are located approximately at Y locations 512 and 514. The Z profile curve 531, which shows the profile of the horizontal groove, is determined based on the averaging the Z values along the X direction across the profile reconstruction region 520 in the map 510. Because of this full width averaging, the profile curve 531 may be considered to correspond to the location of the centrally located Z height profile line 504ply. The Z profile curve 531 shows a groove having irregular side profiles 532 and 534 which provide indications of the vertical locations 512 and 514 of the edge features 522 and 524, which appear to coincide with the width of the floor of the groove. As will be described in more detail below with respect to FIG. 6, the utilization of the square filtering sub regions (e.g. 5×5 pixels) in FIG. 5 causes the Z profile curve 531 to be based on data averaged or filtered in both X and Y directions in the figure, causing a loss of resolution with respect to the Y direction that may be undesirable for profiling and/or locating the edges of the groove.

FIG. 6 is a diagram 600 showing a profile or depth map 610 reconstructed using directional filtering sub regions (in this case, 49 pixels in X, 1 pixel in Y) for each central pixel location, as outlined previously. Similarly to FIG. 5, the different shadings or colors in the map 610 are indicative of rough or noisy surfaces and edges, and the white areas of the map indicated regions where the data and/or the surface is deemed too irregular or noisy to determine a reliable height at that location. Comparison of the maps 510 of FIGS. 5 and 610 of FIG. 6 shows that the results in FIG. 6 are less noisy along the X direction, and higher resolution along the Y direction, as desired. The horizontal groove that is imaged in FIG. 6 is identical to the horizontal groove that was imaged in FIG. 5. As shown in FIG. 6, a profile reconstruction region 620 (e.g. an ROI of a video tool) and a corresponding Z profile 631 in a window 630 are also illustrated.

The profile reconstruction region 620 is shown to include edge features 622 and 624, which are the edges of the horizontal groove. The edge features 622 and 624 are located at vertical positions 612 and 614. The Z profile curve 631, which shows the profile of the horizontal groove, is determined based on the averaging the Z values along the X direction across the profile reconstruction region 620 in the map 610. Because of this full width averaging, the profile curve 631 may be considered to correspond to the location of the centrally located Z height profile line 604ply. However, it will be appreciated that this X direction averaging is not a requirement. For example, with less or no X direction averaging, a Z profile curve could be established for each of a plurality of height profile lines, for example coinciding with each pixel column in the region 620, if desired.

The Z profile curve 631 again shows groove side profiles 632 and 634 which provide indications of the Y locations 612 and 614 of the edge features 622 and 624, which appear to coincide with the width of the floor of the groove. In contrast to FIG. 5, the utilization of the directional filtering sub regions in FIG. 6 causes the Z profile curve 631 to have improved Y profiling resolution. In other words, the curve 631 is shown to be "sharper", with less noise, better resolution, and more detail for the Z profile along the Y direction. For example, the curve 631 shows less rounding and a better definition of the corners of the floor of the groove, giving an improved determination of the location of the edge location lines 612 and 614 corresponding to the edge features 622 and 624. The corresponding decrease in resolution in the X (i.e. horizontal) direction due to the orientation of the directional filtering sub regions may generally be considered to be acceptable, given the objective of obtaining an accurate Z profile and or edge location along the Y direction for the horizontally aligned groove.

As described above with respect to FIGS. 3-6, directional filtering sub regions (DFS) may be utilized to obtain higher resolution Z profiles and/or locations of edge features, and are particularly suitable for noisy edges (e.g. edges of irregular surfaces or irregular edges produced by sawing or laser cutting.) In addition, averaging Z heights along a direction parallel to an edge may be used in combination with directional filtering sub regions, to further reject noise, if desired. In the examples described above, the surface feature of interest (e.g. an edge) was aligned with image rows or columns, and for this reason the DFSs were aligned with the image rows or columns. However, as previously outlined, a more general requirement is that the longer directional filtering direction should be aligned approximately parallel to an edge feature, such that it points along a nominal "constant height contour line" of the edge feature topography. If this condition is fulfilled, then the directionally filtered or averaged focus metric that provides the Z height determination for that DFS will be based on image data that should correspond to a small deviation in actual height, resulting in a more repeatable, accurate and representative Z height at the center of that DFS. In contrast, if this condition is not fulfilled, then the directionally filtered or averaged focus metric that provides the Z height determination for that DFS will be based on image data that is angled across the edge and therefore spans a large deviation of actual heights, producing in a less repeatable, less accurate, and possibly non-representative Z height at the center of that DFS. Thus, if an edge feature of interest is not precisely aligned with image columns or rows then the directional filtering sub region that is used to determine a Z height must still be aligned to the edge feature, and will generally not be aligned to the pixel columns or rows that form the raw image.

To ensure that the longer directional filtering direction is aligned approximately parallel to an edge feature, edge-referenced alignment compensation may be provided, as will be described in more detail below with respect to FIGS. 7-12. In certain embodiments, the edge-referenced alignment compensation may be automatically or semi-automatically provided, so that relatively unskilled users may obtain reliable measurements of noisy edges despite their lack of understanding of critical aspects of the process. In some embodiments, the edge-referenced alignment compensation may be included in the operations and/or user interface of an edge feature video tool or video tool mode that implements the PFF method to determine an edge location and/or edge profile.

Various techniques for edge-referenced alignment compensation are described in copending and commonly assigned U.S. patent application Ser. No. 13/728,842, entitled "METHOD FOR IMPROVING REPEATABILITY IN EDGE LOCATION RESULTS OF A MACHINE VISION INSPECTION SYSTEM", filed on Dec. 27, 2012, which is hereby incorporated by reference in its entirety. The '842 application describes an edge detection or measurement technique based on intensity gradients, including various edge-referenced alignment compensation techniques based on intensity scan lines. The edge-referenced alignment compensation described therein provides improved reliability in discriminating closely spaced edges, for example. Although the '842 application does not describe using edge-referenced alignment compensation in combination with directional filtering to provide a PFF based edge detection for noisy edges, as disclosed herein, some of the edge-referenced alignment compensation techniques described with reference to FIGS. 7A and 7B and further below may be understood by analogy with features described in the '842 application.

For example, in an edge feature video tool based on a PFF mode or method, a Z height profile line such as the lines 404Aply, 404plx, 504ply and 604ply shown in FIGS. 4, 5, and 6, are analogous to the intensity scan lines shown in the '842 application. For example, in each case the gradient of the scan line or the gradient of the height profile line may be used to determine an edge location, and they are largely analogous with respect to the purpose of edge-referenced alignment compensation.

Figures 7A, 7B:
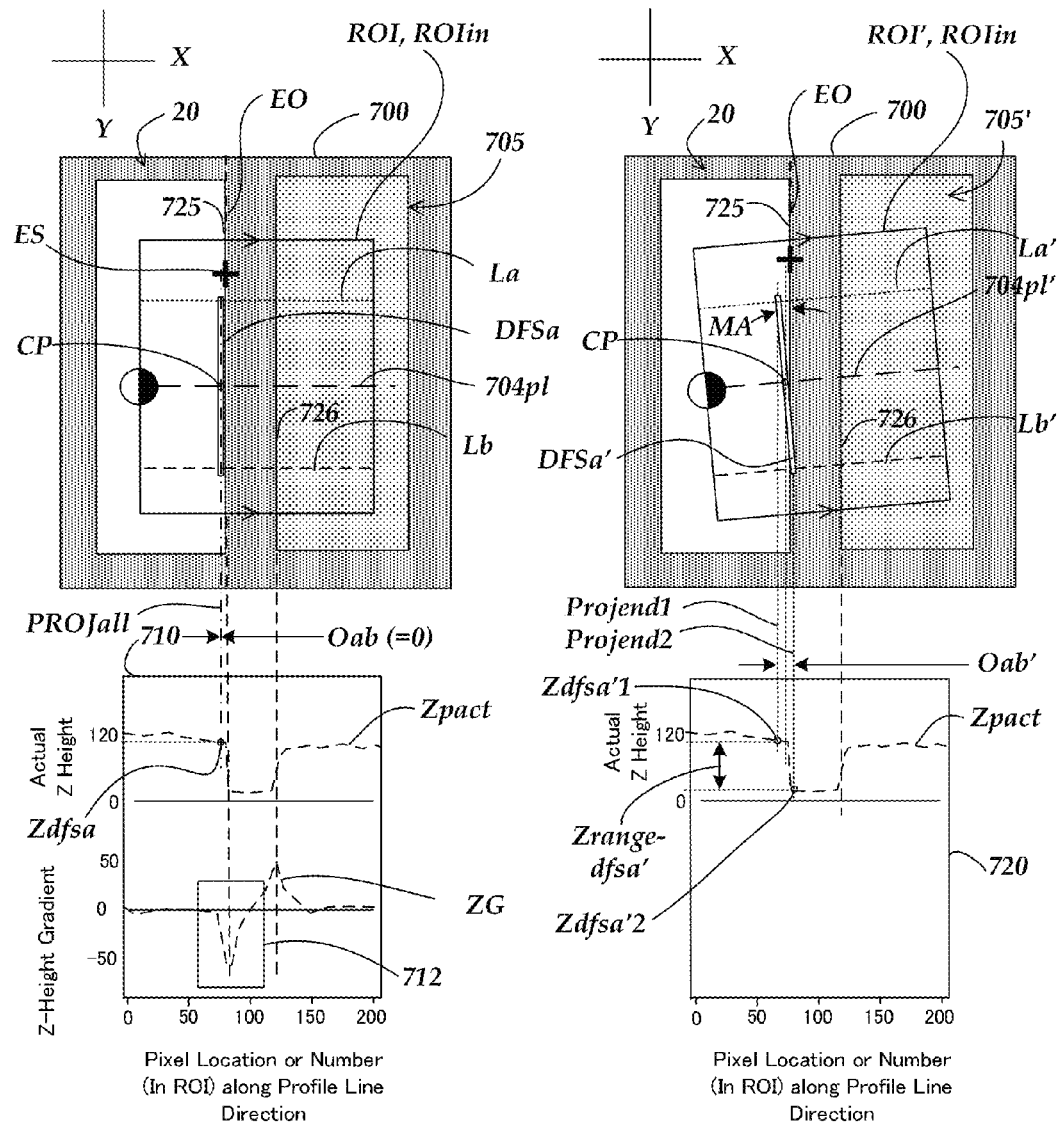
FIGS. 7A and 7B show a straight edge feature in a field of view of a user interface and compare offset amounts of the edge feature along a schematically represented DFS that is aligned in FIG. 7A and misaligned in FIG. 7B as well as related factors in corresponding actual Z height profiles.

FIGS. 7A and 7B show a straight edge feature 725 in a field of view 700 of a user interface and compare offset amounts of the edge feature 725 along a schematically represented aligned DFS, DFSa associated with an aligned video tool 705 in FIG. 7A, and a misaligned DFS, DFSa' associated with a video tool 705' in FIG. 7B, as well as related effects in corresponding height profiles. FIG. 7A shows a field of view window 700 including an image of a workpiece 20 (e.g. imaged by the camera 260), which may be included in a user interface of the machine vision inspection system (e.g. the machine vision inspection system 100). In FIG. 7A, a dashed line illustrates an edge orientation EO of the edge 725 in the image, for purposes of explanation. A region of interest ROI defines a relevant portion of the edge 725, as indicated by the region of interest indicator ROIin. In one embodiment, the region of interest generator 143roi may be operated in conjunction with an edge feature tool 143eft to define the region of interest ROI. For purposes of explanation, FIG. 7A also shows two exemplary parallel height profile lines La and Lb, which may or may not actually be displayed in the edge tool user interface, in various embodiments. Also shown is an edge selector ES, which may be positioned by a user in some embodiments to indicate or mark an edge that is desired to be detected. A second edge 726 is also shown in FIG. 7A.

The lower part of FIG. 7A is a chart 710 which shows an ideal or actual Z height profile Zpact and a corresponding Z height gradient profile ZG (the rate of change of Z height along the profile line), at pixel locations (e.g. pixel numbers) along the central profile line 704pl corresponding to the center point (e.g. the X-Y coordinate) of the aligned DFS, DFSa. It should be appreciated that in one embodiment, and edge feature locating video tool that operates in a PFF mode as disclosed herein identify an edge point or location along a Z height profile line as the location where the maximum Z height gradient occurs (e.g. at the extremum in the box 712). FIG. 7A shows an example where the exemplary DFS, DFSa, is aligned with the edge 725. Due to this alignment, and assuming the edge 725 is approximately straight and uniform over its full length (e.g. the ideal Z height profile is the same along the lines La, 704PL, and Lb, for example), then DFSa intersects a respective Z height profile corresponding to each pixel in DFSa at the same Z height, as illustrated by the aligned projection of each pixel of DFSa along the line PRO-Jall to the corresponding height point Zdfsa. This means that the edge 725 is not "offset" at one pixel location along DFSa relative to another, that is, the offset Oab of the edge at one location along DFSa relative to another will be approximately zero. Because of this, the actual image focus height will be approximately the same at all pixels within DFSa (with the exception of unavoidable surface height and/or image noise), and the associated contrast or focus metric will accurately reflect the nominal height Zdfsa, which is the proper Z height to be associated with DFSa (e.g. as the measured Z height at the location of DFSa along location of the profile line 704pl.

Similarly aligned DFSs throughout the ROI will have similar accuracy for the same reasons, and the resulting Z height profile(s) will indicate the location of the edge 725 with good fidelity, and high resolution along the narrow direction of the DFSs (e.g. a direction transverse to the edge 725).

In contrast to FIG. 7A, FIG. 7B shows a field of view window 700 including an image of the workpiece 20 wherein the region of interest ROI' and/or the representative DFS, DFSa', is rotated or "misaligned" relative to the edge 725.

The lower part of FIG. 7B is a chart 720 which shows the ideal or actual Z height profile Zpact, previously described with reference to FIG. 7A. FIG. 7B shows an example where the exemplary DFS, DFSa', is misaligned with the edge 725. Due to this misalignment, and assuming the edge 725 is approximately straight and uniform over its full length (e.g. the ideal Z height profile is the same along the lines La', 704pl', and Lb', for example), then DFSa' intersects a respective Z height profile corresponding to each pixel in DFSa' at a different Z height, as illustrated by the aligned projection of a "top end" pixel of DFSa' along the line Projend1 to the corresponding height point Zdfsa'1, and by the aligned projection of a "bottom end" pixel of DFSa' along the line Projend2 to the corresponding height point Zdfsa'2. This means that the edge 725 is "offset" at one pixel location along DFSa' relative to another, that is, the offset Oab' of the edge 725 at one location along DFSa relative to another may be significant Oab', as illustrated. Because of this, the actual image focus height will general not be the same at all pixels within DFSa', as illustrated by the range of Z heights Zrange-dfsa', shown in the chart 720. This means the associated contrast or focus metric will include differently focused image portions, such that it cannot accurately reflect the nominal height at the center point CP of the DFSa' (e.g. Zdfsa, as shown in FIG. 7A, which is the proper Z height at the location of CP along the profile line 704pl'. In fact, in the example shown in FIG. 7B, it can be seen that DFSa' will include Z height image portions significantly below the nominal Z height at the center point CP of DFSa', which will cause the contrast or focus metric (and the measured Z height) of DFSa' to be erroneously low. From another perspective, we can say that since DFSa' is misaligned such that its longer filtering direction is partially across the edge 725, it provides some directional filtering across the edge 725, which smoothes and distorts the height information surrounding the edge 725 such that its true profile is lost. Similarly misaligned DFSs throughout ROI' may have similar inaccuracy for the same reasons, and the resulting Z height profile(s) will indicate the location of the edge 725 with poor accuracy and/or resolution.

As indicated by FIGS. 7A and 7B, it is desirable for an edge video tool that employs DFSs and a PFF technique to provide edge referenced alignment compensation to either remove or compensate for the offset Oab' (which corresponds to the misalignment angle MA in FIG. 7B, for example), or the like, so that the image data throughout a DFS (or throughout a set of averaged data used by other directional filtering techniques to improve the detected or estimated location of noisy edges) has approximately the same nominal focus height. This enhances the ability of such an edge video tool to provide the desired Z height accuracy and resolution, as illustrated in FIG. 7A. Edge referenced alignment compensation is particularly possible and desirable for edges that have an approximately known shape (e.g. a straight or circular shape known to a user of the inspection system and/or reflected in a particular video tool type or parameter, or the like), as described in greater detail below.

In order to compensate the offset (if any) of one DFS pixel relative to one another along an edge feature such that corresponding pixels of the DFS have content that is properly combinable (e.g. of nominally similar Z heights) by analysis that includes averaging or filtering operations, various methods may be used to identify the offset relative to a preliminary direction, which may alternatively be characterized as an original, reference, or default direction, and which may also be characterized and/or used as a preliminary directional filtering direction. For example, in one embodiment, a preliminary Z-height map may be determined for the ROI based square contrast kernels (e.g. the square sub region 305). Then Z-height profiles may be determined for a plurality of parallel lines transverse to the edge, and distributed along the edge, in that height map. These preliminary profile lines may be based on the overall alignment of the ROI, (e.g. perpendicular to the sides of the ROI) in some embodiments, for example, like the profile lines La' and Lb' in FIG. 7B. Preliminary edge points corresponding to the edge to be referenced may be located along each such profile line (e.g. as corresponding to a Z height gradient peak location). Since the image data, and/or the underlying surfaces are noisy, in some embodiments, several profile lines may be used. In the case of a straight edge (as shown in FIGS. 7A and 7B) a line may be fit to these edge points, and the misalignment angle (e.g. the angle MA, in FIG. 7B) of that fit line relative to that ROI and/or the preliminary or default DFS directions of that ROI may be determined. The difference in the offset distance of the fitted line from an exemplary DFS direction at two locations along the DFS will be sin(MA)*distance between the two locations. More generally, in various embodiments, the edge measurement video tool is one of a box tool, a circle tool, and an arc tool, and characterizing the respective offset amount of the edge feature along respective DFSs comprises detecting edge points, fitting a line shape associated with the video tool to the edge points, and characterizing the respective offset amount of the fitted line at various locations along a preliminary or default directional filtering direction used for directionally filtering by the video tool. When the video tool is a box tool, the line shape associated with the video tool is a straight line, and characterizing the respective offset amount of the fitted line at various locations along a preliminary directional filtering direction may comprise determining an angle between the fitted line and a preliminary or default DFS direction of that ROI. When the edge measurement video tool is a circle tool, the preliminary profile lines may all be along radii extending from a center of the circle tool, the line shape associated with the video tool is circle, and characterizing the respective offset amount of the fitted line along respective preliminary profile lines may comprise determining where the fitted circle intersects the preliminary profile lines. In any case, it will be appreciated that once a misalignment angle is characterized for a straight edge (or a more complicated characterization is made for the misalignment of a fitted circular edge relative of a preliminary "DFS circle or arc", for a in a circle or arc tool), then the direction of the DFS in the tool may be adjusted to be aligned properly with the edge, according to principles outlined above. In one embodiment, when the edge measurement video tool is a circle tool or an arc tool, the respective DFS arcs may all be "concentric" DFSs perpendicular to radii extending from a center of the circle or arc tool, the line shape associated with the video tool may be a circle (or portion of a circle), and the center of the fitted circle may be determined relative to the center of the circle or arc tool or the scan line center. Then, the tool center may be adjusted to coincide with the center of the fitted circle, and the adjusted radii and associated arc shaped DFS locations may be computed.

It will be appreciated that alternatively for a straight edge, a workpiece and camera may be rotated relative to one another, such that pixel rows or columns of the camera are used to define the DFS direction, and are oriented along a parallel direction relative to the edge on the workpiece, although this may be a time consuming or impossible alternative in many machine vision systems and therefore may not be preferred in such systems. In either case, the adjustment of the DFS direction such that it is actually parallel to the edge may be considered as the edge-referenced alignment compensation.

It will be appreciated all the pixels in a DFS are not likely to coincide exactly with an image pixel locations. In such a case, the image value at a "pixel" location in the DFS used for PFF operations may be determined by interpolation based on the surrounding image pixels, according to various known methods. Computing interpolated image intensity along a desired line and/or direction based on previously obtained image data is taught for example in U.S. Pat. No. 7,567,713 to Ding, which is hereby incorporated herein by reference in its entirety.

Another alternative way of determining a misalignment may include performing a search that varies the orientation and/or position of a representative DFS or set of DFSs associated with a video tool in the X-Y plane, and for each orientation and/or position, characterizing the distribution of Z heights along the directional filtering direction associated with each orientation and/or position. The width of the distribution, essentially characterizes the offset or misalignment of the associated directional filtering direction. The DFS orientation and/or position may then be set to the orientation and/or position that provides the narrowest distribution of Z heights (e.g. the smallest standard deviation) in a DFS or set of DFSs, and this may be considered as the edge-referenced alignment compensation.

Another alternative way of determining a misalignment may include performing a search that varies the orientation and/or position of a representative set of DFSs associated with a video tool in the X-Y plane and, for each orientation and/or position of the set, forming at least one preliminary Z height profile that crosses the edge. In one such embodiment, the DFSs are defined and/or used in a way that results in a single representative composite edge profile (that is, a Z height across the edge) that represents the average Z height profile based on the entire representative set of DFSs. In any case, the resulting preliminary Z height profiles are evaluated. The sharpness of the edge, as characterized in the resulting profiles essentially characterizes the offset or misalignment of the associated directional filtering direction. In particular, the orientation and/or position that provides the narrowest edge and/or the narrowest gradient peak and/or highest edge gradient in the Z height profiles, is the orientation and/or position that is best aligned and that defines the edge-referenced alignment compensation and/or the operational directional filtering direction. Stated another way, the orientation and/or position that provides the narrowest edge and/or the narrowest gradient peak and/or highest edge gradient in its corresponding Z height profile corresponds to an edge-referenced alignment compensation that substantially minimizes the respective offset amount of the edge feature at respective locations along a directional filtering direction used for providing that Z height profile. The foregoing procedure may be used during learn mode, and/or run mode. In some embodiments, the best Z height profile determined during learn mode (which corresponds to the best edge-referenced alignment compensation) is saved in a part program, and during run mode the run mode directional filtering direction is adjusted based on approximately maximizing a match of the corresponding run mode Z height profile to the stored learn mode Z height profile. Other alternatives for providing edge-referenced alignment compensation for a DFS direction may be apparent to one of ordinary skill in the art having the benefit of this disclosure.

It should be appreciated that when a part program is created the parameters characterizing a particular workpiece edge that is to be located by an edge detection video tool (also referred to as the "learned" edge parameters) will be based on video tool alignment and DFS parameter as they are oriented relative to the edge during learn mode. In contrast, when that part program is run to automatically detect the corresponding edge on a different workpiece during a run mode, the workpiece edge may be rotated or translated to a slightly different angle or position relative to the programmed video tool, which makes it more likely that the learned edge parameters will fail to match the characteristics of the edge during run mode. It will be appreciated that for noisy edges in particular, reliable edge detection is inherently difficult, and the margin for such errors may be minimal. Therefore, to increase edge detection reliability in such cases, it may desirable to ensure that the run mode DFS orientation relative to an edge feature is as similar as possible to the learn mode DFS orientation, which will increase the likelihood of a match between the learned edge parameters included in a part program and the observed edge characteristics during run mode. In this case, in one embodiment, the adjustment of the DFS direction such that it is actually parallel to the edge during learn mode and/or run mode may be considered as the edge-referenced alignment compensation. In another embodiment, the actual orientation of the DFS direction relative to the edge, or another characterization of the DFS direction (e.g. Z height profile or distribution for Z heights that occur along the DFS direction) may be determined and recorded during learn mode, and then the run mode DFS orientation relative to the edge may be adjusted to best match the actual DFS orientation or other characterization recorded during learn mode. In this case, the adjustment of the run mode DFS orientation relative to the edge such that it matches the actual DFS orientation relative to the edge or other DFS characterization recorded during learn mode (e.g. based on a correlation analysis or other known data/profile comparison techniques) may be considered as the edge-referenced alignment compensation. In some such embodiments, the DFS direction may be adjusted during learn mode and/or run mode such that a gradient corresponding to the edge feature in a Z height profile determined based on DFS data along a direction perpendicular to the DFS longer dimension is approximately maximized. In any case, the procedures outlined above may increase the reliability of edge detection parameters determined for a learn mode workpiece and recorded in a part program when the part program is applied to similar workpieces during run mode.

As previously outlined, it will be appreciated that in some embodiments, the DFS direction may be defined relative to the video tool (e.g. the video tool region of interest) and adjustment and/or compensation of the DFS direction may comprise adjustment of an element or feature of the region of interest. Thus, it will be appreciated that the DFS direction may be adjusted and/or compensated directly (e.g. by a video tool parameter directly related to the DFS) or indirectly (e.g. through a related video tool feature or parameter that affects the DFS) in various embodiments.

Figure 8A:
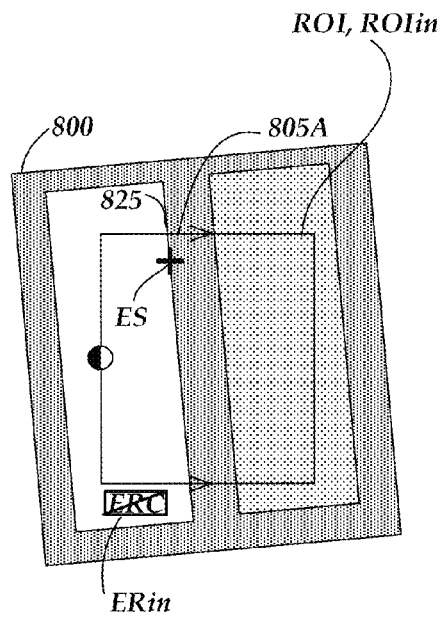
FIGS. 8A-8C show a PFF box tool positioned for determining PFF profile data for a straight edge feature in a workpiece image, including various video tool user interface embodiments for indicating the PFF box tool status related to providing an edge-referenced alignment compensation that substantially eliminates DFS/edge offsets according to principles disclosed herein.
Figure 8C:
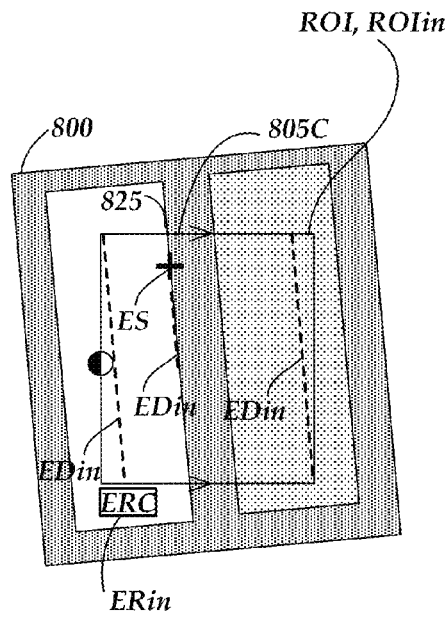
Figure 8B:
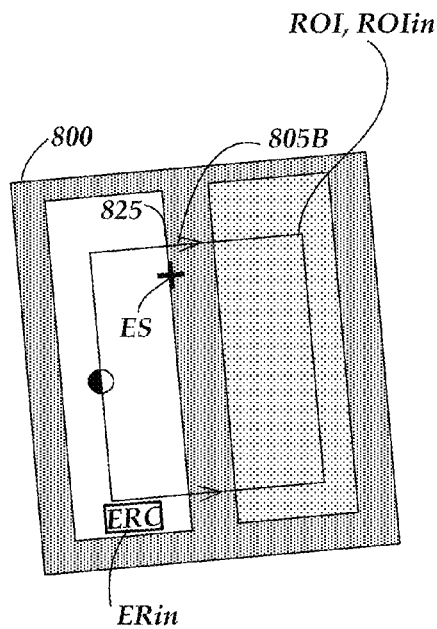

FIGS. 8A-8C show a PFF box tool 800 positioned for determining profile and/or edge location data for a straight edge feature 825 in a workpiece image, including various video tool user interface embodiments for indicating the box tool status related to providing an edge-referenced alignment compensation that substantially eliminates DFS/edge offsets according to principles disclosed herein. As shown in FIGS. 8A-8C, the box tool comprises a user interface including at least a region of interest indicator ROIin superimposed on an image of the workpiece, and it provides an indication that the edge-referenced alignment compensation has been provided (or not been provided) that is superimposed on the image of the workpiece in the user interface. In some such embodiments, adjusting the user interface element may comprise changing a property of one or more elements that are superimposed on the image of the workpiece (e.g. their color, or line type, or the like), or adding or adjusting an edge-referenced alignment compensation indicator (e.g. the Edge Referenced indicator ERin icon or widget) superimposed on the image. As shown in FIG. 8A, the edge-referenced alignment compensation has not yet been provided (e.g. the tool has not yet been run or trained in learn mode or manual mode). As a result, the video tool GUI appears in an initial state (e.g. an untrained state). In some embodiments, the optional Edge Referenced indicator ERin may be displayed in a state that indicates that the edge-referenced alignment compensation has not yet been provided. In other embodiments, the video tool GUI simply appears in its initial state.

As shown in FIGS. 8B and 8C, the edge-referenced alignment compensation has been provided (e.g. the tool has been run or trained in learn mode or manual mode). In this particular embodiment, internal operations of the video tool have eliminated the offset between respective locations along a directional filtering direction (e.g. by adjusting the DFS direction based on a preliminary misalignment angle determination, as outlined previously). As a result, in some embodiments, the optional Edge Referenced indicator ERin may be displayed in a state that indicates that the edge-referenced alignment compensation has been provided. In other embodiments, the video tool GUI adjusts one of its elements relative to its initial state, in a manner that suggests that the edge-referenced alignment compensation has been provided. For example, in FIG. 8B the video tool 800, which is a box tool, adjusts the user interface by rotating the region of interest indicator such that one of its axes is perpendicular to the edge feature, while the other axis represents the directional filtering direction and is parallel to the edge feature. In FIG. 8C, the video tool 800 provides and/or rotates one or more edge direction indicator(s) EDin such that it is parallel to the edge feature 825. In one embodiment, one of the edge direction indicators EDin may be referenced as a "line shape" that is aligned with the edge feature, and as shown may be oriented at an angle relative to an original or default directional filtering direction (e.g. as represented by the vertical edges of the region of interest indicator ROIin.) An angle between one of the edge direction indicators EDin and one of the vertical edges of the region of interest indicator ROIin may thus be used to characterize the respective offset amount of the aligned line shape (e.g. the edge direction indicator EDin) at respective locations along the original or default directional filtering direction (e.g. as represented by the vertical edge of the region of interest indicator ROIin.)

Figure 9A:
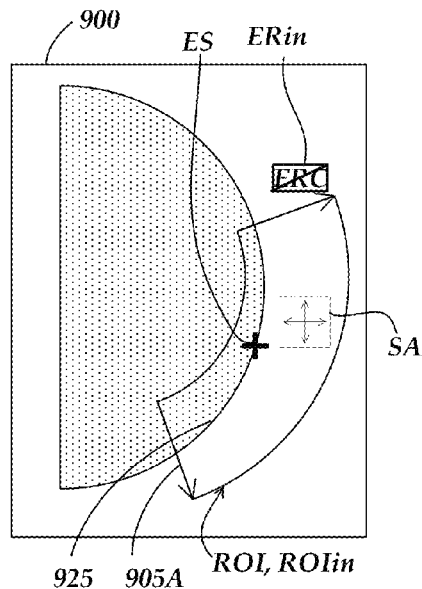
FIGS. 9A-9C show a PFF arc tool positioned for determining PFF profile data for a circular edge feature portion in a workpiece image, including various video tool user interface embodiments for indicating the PFF arc tool status related to providing an edge-referenced alignment compensation that substantially eliminates DFS/edge offsets according to principles disclosed herein.
Figure 9C:
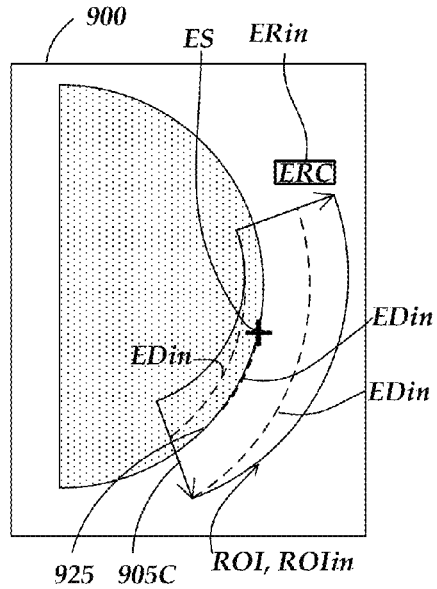
Figure 9B:
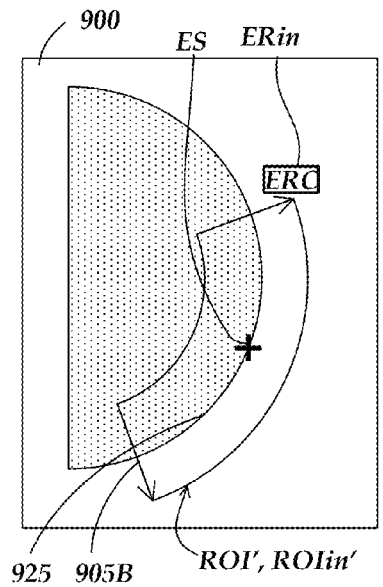

FIGS. 9A-9C show a PFF arc tool 900 positioned for determining profile and/or edge location data for a circular edge portion 925 in a workpiece image, including various video tool user interface embodiments for indicating the arc tool status related to providing an edge-referenced alignment compensation that substantially eliminates DFS/edge offsets according to principles disclosed herein. FIGS. 9A-9C are analogous to FIGS. 8A-8C and may be similarly understood, therefore only a brief description will be provided. The arc tool 900 comprises a user interface including a region of interest indicator ROIin superimposed on an image of the workpiece. As shown in FIG. 9A, the edge-referenced alignment compensation has not yet been provided. As a result, the video tool GUI appears in an initial state (e.g. an untrained state). In some embodiments, the optional Edge Referenced indicator ERin may be displayed in a state that indicates that the edge-referenced alignment compensation has not yet been provided. In other embodiments, the video tool GUI simply appears in its initial state.

As shown in FIGS. 9B-9C, the edge-referenced alignment compensation has been provided (e.g. the tool has been run or trained in learn mode or manual mode). In this particular embodiment, internal operations of the video tool have eliminated the offset between the edge and respective locations along a circular/tangential directional filtering direction (e.g. by adjusting the DFS direction and or position based on a preliminary misalignment determination, as outlined previously). As a result, in some embodiments, the optional Edge Referenced indicator ERin may be displayed in a state that indicates that the edge-referenced alignment compensation has been provided. In other embodiments, the video tool GUI adjusts one of its elements relative to its initial state, in a manner that suggests that the edge-referenced alignment compensation has been provided. For example, in FIG. 9B the video tool 900 adjusts the user interface by positioning the region of interest indicator ROIin such that its arc boundaries are approximately concentric with the edge feature 925. In FIG. 9C, the video tool 900 provides and/or positions the edge direction indicator(s) EDin such that it is approximately concentric with the edge feature. In one embodiment, one of the edge direction indicators EDin may be referenced as a "line shape" that is aligned with the edge feature, and as shown may be oriented at an angle relative to the original or default directional filtering direction (e.g. as represented by the arc edges of the region of interest indicator ROIin.) An offset between one of the edge direction indicators EDin and one of the arc edges of the region of interest indicator ROIin may thus be used to characterize the respective offset amount of the aligned line shape (e.g. the edge direction indicator EDin) at respective locations along the original or default directional filtering direction (e.g. as represented by the arc edge of the region of interest indicator ROIin.) It will be appreciated that various embodiments of a circle tool may have analogous features to the arc tool embodiments shown in FIGS. 9A-9C.

FIG. 9A shows an exemplary optional search area indicator SA, which may be included in a user interface of various video tools to indicate a search area that is used for search procedures for alignment compensation, as outlined previously. In some embodiments, a user may adjust the size of the search area (e.g. by dragging a side or corner) to cause a faster search (e.g. a smaller search area) or a more robust search (e.g. a larger search area).

As outlined previously, in some embodiments the edge-referenced alignment compensation determines the respective offset amount(s) at respective locations along a directional filtering direction, and it is used to adjust the data such that the respective offset amount of the edge feature at the respective locations along the directional filtering direction is substantially compensated as outlined previously. In such embodiments, adjusting the user interface element may comprise adjusting at least one of the region of interest indicator, an edge direction indicator, and a display representing detected edge points, to symbolically represent the respective offset amount(s). FIGS. 10A-10C and FIGS. 11A-11C show user interface features which may be used in such embodiments.

Figure 10A:
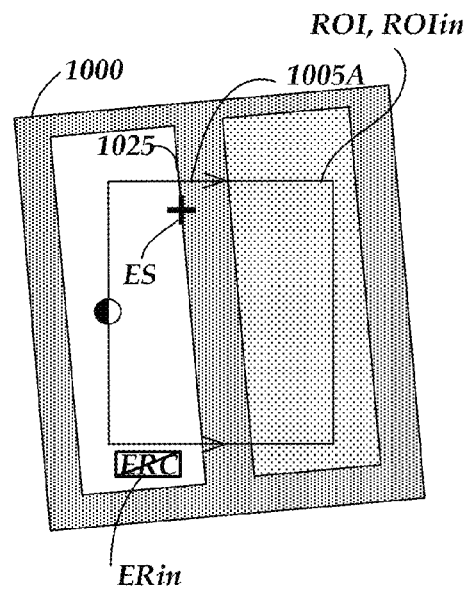
FIGS. 10A-10C show a PFF box tool positioned for determining PFF profile data for a straight edge feature in a workpiece image, including various video tool user interface embodiments for indicating the PFF box tool status related to providing an edge-referenced alignment compensation that substantially compensates DFS/edge offsets according to principles disclosed herein.
Figure 10B:
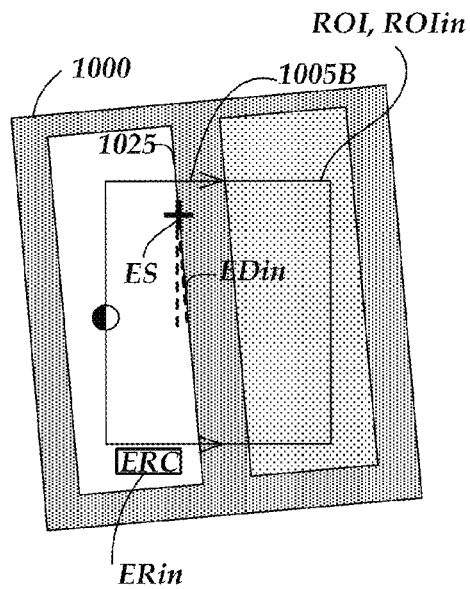
Figure 10C:
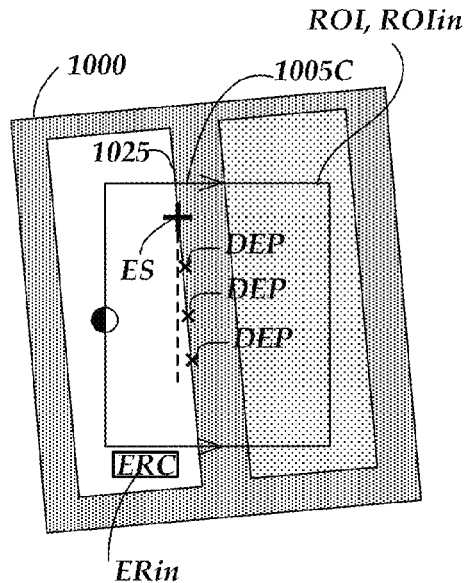

FIGS. 10A-10C are in a general way analogous to FIGS. 8A-8C and may be similarly understood, therefore only a brief description will be provided. The box tool 1000 comprises a user interface including a region of interest indicator ROIin superimposed on an image of the workpiece. As shown in FIG. 10A, the edge-referenced alignment compensation has not yet been provided. As a result, the video tool GUI appears in an initial state (e.g. an untrained state). In some embodiments, the optional Edge Referenced indicator ERin may be displayed in a state that indicates that the edge-referenced alignment compensation has not yet been provided. In other embodiments, the video tool GUI simply appears in its initial state.

As shown in FIGS. 10B and 10C, the edge-referenced alignment compensation has been provided (e.g. the tool has been run or trained in learn mode or manual mode). In this particular embodiment, internal operations of the video tool have determined the offset at respective locations along a directional filtering direction (e.g. such that it may be computationally compensated as outlined previously.) As a result, in some embodiments, the optional Edge Referenced indicator ERin may be displayed in a state that indicates that the edge-referenced alignment compensation has been provided. In other embodiments, the video tool GUI adjusts one of its elements relative to its initial state, in a manner that suggests that the edge-referenced alignment compensation has been provided. For example, in FIG. 10B it provides and/or positions the edge direction indicator EDin such that it is parallel to the edge feature 1025 and/or indicates an angle between the edge feature 1025 and a line indicative of the original or default directional filtering direction (e.g. which is shown to be parallel to the vertical edges of the region of interest indictor ROIin.) In FIG. 10C, it provides and/or positions a detected edge point representation(s) DEP, or a line fit to the detected edge points, approximately along the edge feature. In certain implementations, a line fit to the detected edge points may be used to indicate an angle relative to the original or default directional filtering direction (e.g. which is shown to be parallel to the vertical edges of the region of interest indicator ROIin), and/or a horizontal distance between each of the detected edge point representations DEP and a line representing the directional filtering direction may be used to characterize the respective offset amount at respective locations (e.g. at each detected edge point representation DEP) along the original or default directional filtering direction.

Figure 11A:
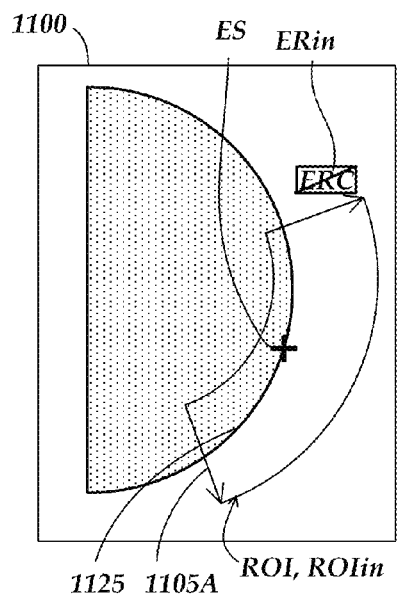
FIGS. 11A-11C show a PFF arc tool positioned for determining PFF profile data for a circular edge portion in a workpiece image, including various video tool user interface embodiments for indicating the PFF arc tool status related to providing an edge-referenced alignment compensation that substantially compensates DFS/edge offsets according to principles disclosed herein.
Figure 11B:
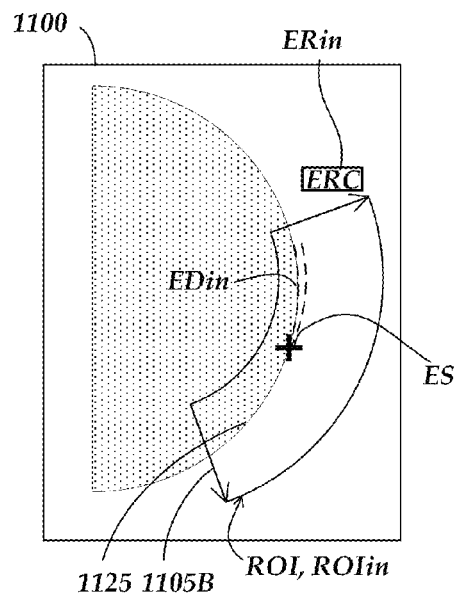
Figure 11C:
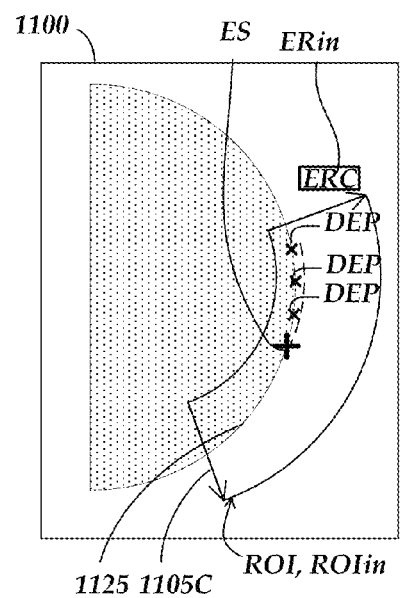

FIGS. 11A-11C are in a general way analogous to FIGS. 9A-9C and may be similarly understood, therefore only a brief description will be provided. The arc tool 1100 comprises a user interface including a region of interest indicator ROIin superimposed on an image of the workpiece. As shown in FIG. 11A, the edge-referenced alignment compensation has not yet been provided. As a result, the video tool GUI appears in an initial state (e.g. an untrained state). In some embodiments, the optional Edge Referenced indicator ERin may be displayed in a state that indicates that the edge-referenced alignment compensation has not yet been provided. In other embodiments, the video tool GUI simply appears in its initial state.

As shown in FIGS. 11B and 11C, the edge-referenced alignment compensation has been provided (e.g. the tool has been run or trained in learn mode or manual mode). In this particular embodiment, internal operations of the video tool have determined the offset at respective locations along a directional filtering direction (e.g. such that it may be computationally compensated as outlined previously.) As a result, in some embodiments, the optional Edge Referenced indicator ERin may be displayed in a state that indicates that the edge-referenced alignment compensation has been provided. In other embodiments, the video tool GUI adjusts one of its elements relative to its initial state, in a manner that suggests that the edge-referenced alignment compensation has been provided. For example, in FIG. 11B it provides and/or positions the edge direction indicator EDin such that its curve is approximately concentric or coincident with the edge feature 1125 and/or indicates an angle between the edge feature 1125 and a line indicative of the original or default directional filtering direction (e.g. which is shown to be concentric with the arc edges of the region of interest indictor ROIin.) In FIG. 11C, it provides and/or positions a detected edge point representation(s) DEP, or a line fit to the detected edge points, approximately along the edge feature. In certain implementations, a line fit to the detected edge points may be used to indicate an angle relative to the original or default directional filtering direction (e.g. which is shown to be concentric with the arc edges of the region of interest indicator ROIin), and/or a distance between each of the detected edge point representations DEP and a line representing the directional filtering direction may be used to characterize the respective offset amount at respective locations (e.g. at each detected edge point representation DEP) along the original or default directional filtering direction.

In various embodiments, implementation of the edge-referenced alignment compensation methods disclosed herein may comprise one of a) selecting the edge feature video tool such that it is a type that includes edge-referenced alignment compensation operations, b) selecting an edge-referenced alignment compensation mode or option of the edge feature video tool which includes edge-referenced alignment compensation operations, c) selecting a directional filtering mode or option of the edge feature video tool which includes edge-referenced alignment compensation operations, and d) selecting an edge-referenced alignment compensation tool that provides edge-referenced alignment compensation operations that operate in conjunction with the edge feature video tool. In such embodiments, the step of analyzing the plurality of respective locations along a directional filtering direction in order to provide the edge-referenced alignment compensation may comprise executing the edge-referenced alignment compensation operations in conjunction with operations of the edge feature video tool.

In some cases, the method is performed during a learn mode of the machine vision system and corresponding operations are recorded in a part program. In other cases, at least some steps of the method are performed during a run mode of the machine vision system by executing corresponding operations recorded in a part program.

In some embodiments, the method may further comprise applying the edge-referenced alignment compensation to adjust the directional filtering direction such that the respective offset amount of the edge feature at respective locations along the directional filtering direction is at least one of a) substantially removed b) substantially compensated, and c) substantially matched to a previously determined respective offset amount of a corresponding edge feature at respective locations along the directional filtering direction.

It will be appreciated that these edge-referenced alignment compensation status indicators shown in FIGS. 8-11 are exemplary only, and not limiting.

Figure 12:
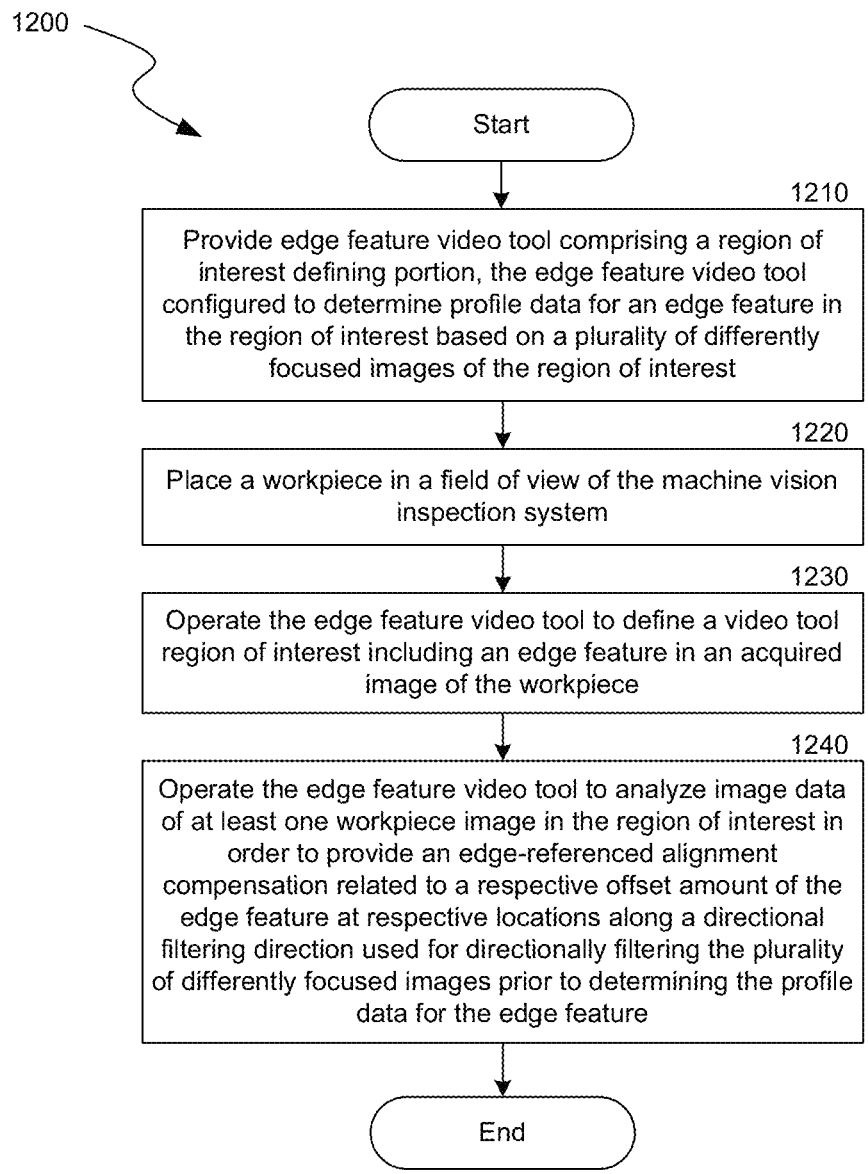
FIG. 12 is a flow diagram of a method for enhanced edge detection for edges of irregular surfaces in a machine vision inspection system.

FIG. 12 is a flow diagram of a method 1200 for enhanced edge detection for edges of irregular surfaces in a machine vision inspection system. At a block 1210, an edge feature video tool is provided comprising a region of interest defining portion. The edge feature video tool is configured to determine profile data for an edge feature in the region of interest based on a plurality of differently focused images of the region of interest. In one specific example implementation, such images may be obtained as part of points from focus (PFF) operations.

At a block 1220, a workpiece is placed in a field of view of the machine vision inspection system. At a block 1230, the edge feature video tool is operated to define a video tool region of interest including an edge feature in an acquired image of the workpiece. At a block 1240, the edge feature video tool is operated to analyze image data of at least one workpiece image in the region of interest in order to provide an edge-referenced alignment compensation. The edge-referenced alignment compensation is related to substantially minimizing a respective offset amount of the edge feature at respective locations along a directional filtering direction used for directionally filtering the plurality of differently focused images prior to determining the profile data for the edge feature.

Figure 13:
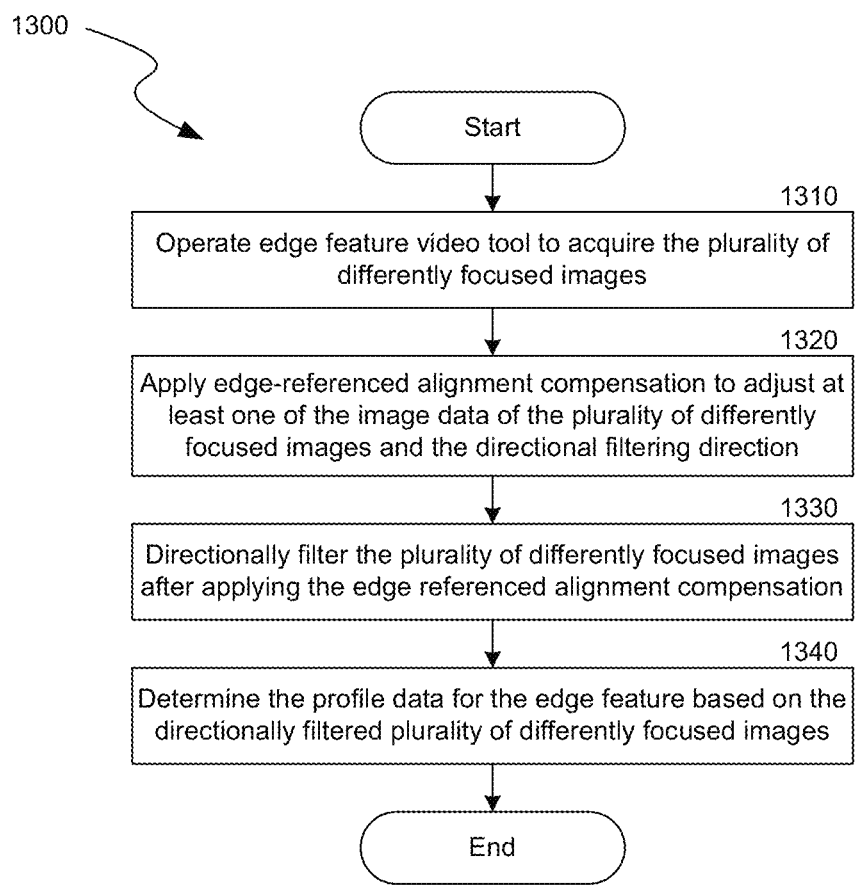
FIG. 13 is a flow diagram of a method for determining PFF profile data for an edge feature based on directional filtering.

FIG. 13 is a flow diagram of a method 1300 for determining profile data for an edge feature based on directional filtering. At a block 1310, the edge feature video tool is operated to acquire the plurality of differently focused images. At a block 1320, the edge-referenced alignment compensation is applied to adjust the directional filtering direction. At a block 1330, the plurality of differently focused images are directionally filtered after applying the edge referenced alignment compensation. At a block 1340, the profile data for the edge feature is determined based on the directionally filtered plurality of differently focused images.

Figure 14:
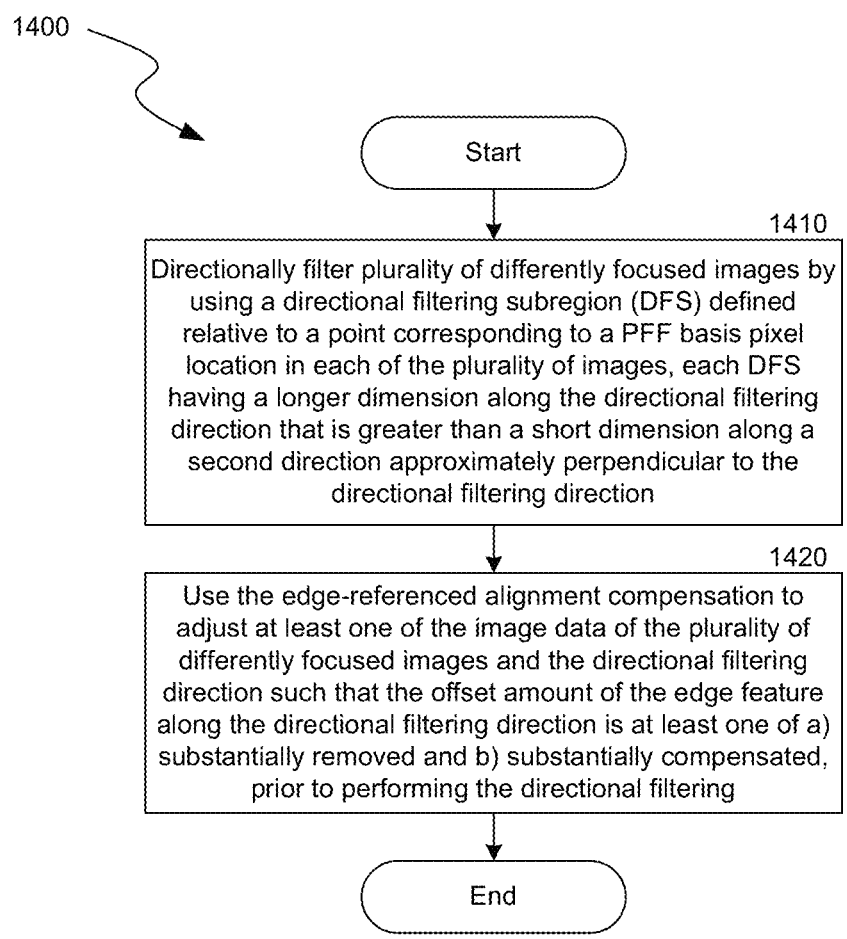
FIG. 14 is a flow diagram of a method for performing directional filtering utilizing directional filtering sub regions defined relative to PFF based pixel locations.

FIG. 14 is a flow diagram of a method 1400 for performing directional filtering utilizing directional filtering sub regions defined relative to points from focus (PFF) basis pixel locations. At a block 1410, a plurality of differently focused images are directionally filtered using a directional filtering sub region (DFS) defined relative to a point corresponding to a PFF basis pixel location in each of the plurality of images. Each DFS is shaped so as to have a longer dimension along the directional filtering direction that is greater than a short dimension along a second direction approximately perpendicular to the directional filtering direction. At a block 1420, the edge-referenced alignment compensation is used to adjust the directional filtering direction. The adjustment is performed such that the offset amount of the edge feature along the directional filtering direction is at least one of a) substantially removed and b) substantially compensated, prior to performing the directional filtering.

From the foregoing, it will be appreciated that specific embodiments of the invention have been described herein for purposes of illustration, but that various modifications may be made without deviating from the scope of the invention. Accordingly, the invention is not limited except as by the appended claims.

I claim:

1. A method for determining profile data for an edge feature in a machine vision inspection system, the machine vision inspection system comprising:
    an edge feature video tool comprising a region of interest defining portion, the edge feature video tool configured to determine profile data for an edge feature in the region of interest based on a plurality of differently focused images of the region of interest;
    the method comprising:
        placing a workpiece in a field of view of the machine vision inspection system;
        operating the edge feature video tool to define a video tool region of interest including an edge feature in an acquired image of the workpiece; and operating the edge feature video tool to analyze image data of at least one workpiece image in the region of interest in order to provide an edge-referenced alignment compensation related to substantially minimizing a respective offset amount of the edge feature at respective locations along a directional filtering direction used for directionally filtering the plurality of differently focused images prior to determining the profile data for the edge feature.

2. The method of claim 1, wherein the edge-referenced alignment compensation is usable to adjust the directional filtering direction such that the respective offset amount of the edge feature at respective locations along the directional filtering direction is at least one of a) substantially removed, b) substantially compensated, and c) substantially matched to a previously determined respective offset amount of a corresponding edge feature at respective locations along the directional filtering direction.

3. The method of claim 1, further comprising:
operating the edge feature video tool to acquire the plurality of differently focused images;
applying the edge-referenced alignment compensation to adjust the directional filtering direction;
directionally filtering the plurality of differently focused images after applying the edge referenced alignment compensation, and
determining the profile data for the edge feature based on the directionally filtered plurality of differently focused images.

4. The method of claim 3, wherein
directionally filtering the plurality of differently focused images comprises using a directional filtering sub region (DFS) defined relative to a point corresponding to a PFF basis pixel location in each of the plurality of images, each DFS having a longer dimension along the directional filtering direction that is greater than a short dimension along a second direction approximately perpendicular to the directional filtering direction; and
the edge-referenced alignment compensation is used to adjust the directional filtering direction such that the offset amount of the edge feature along the directional filtering direction is at least one of a) substantially removed and b) substantially compensated, prior to performing the directional filtering.

5. The method of claim 4, wherein the short dimension is at most 5 pixels and the longer dimension is at least 3 times the short dimension.

6. The method of claim 5, wherein one of a Z height or PFF metric associated with the PFF basis pixel location of the DFS is determined exclusively based on the pixels included in that DFS.

7. The method of claim 1, wherein the edge feature video tool comprises a user interface including at least a region of interest indicator superimposed on an image of the workpiece, and the method further comprises providing an indication that the edge-referenced alignment compensation has been provided, by adjusting an element that is superimposed on the image of the workpiece in the user interface.

8. The method of claim 7, wherein adjusting an element that is superimposed on the image of the workpiece in the user interface comprises adjusting at least one of the region of interest indicator, an edge direction indicator, and a directional filtering direction indicator to indicate that the edge-referenced alignment compensation has been provided.

9. The method of claim 8, wherein the edge feature video tool is configured corresponding to a straight edge feature and adjusting the region of interest indicator comprises positioning the region of interest indicator such that one of its axes is perpendicular to the edge feature, adjusting the edge direction indicator comprises positioning the edge direction indicator such that it is parallel to the edge feature, and adjusting the directional filtering direction indicator comprises positioning the directional filtering direction indicator such that it is one of parallel to or perpendicular to the edge feature.

10. The method of claim 8, wherein the edge feature video tool is configured corresponding to one of a circular edge feature and a circular arc edge feature and adjusting the region of interest indicator comprises positioning the region of interest indicator such that its boundaries are approximately concentric with the edge feature, adjusting the edge direction indicator comprises positioning the edge direction indicator such that it is approximately concentric with the edge feature, and adjusting the directional filtering direction indicator comprises positioning the directional filtering direction indicator such that it is approximately concentric with the edge feature.

11. The method of claim 7, wherein adjusting an element that is superimposed on the image of the workpiece in the user interface comprises one of changing a property of an element that is superimposed on the image of the workpiece, and adding an edge-referenced alignment compensation indicator superimposed on the image.

12. The method of claim 1, wherein:
the method comprises one of a) selecting the edge feature video tool such that it is a type that includes edge-referenced alignment compensation operations, b) selecting an edge-referenced alignment compensation mode or option of the edge feature video tool which includes edge-referenced alignment compensation operations, c) selecting a directional filtering mode or option of the edge feature video tool which includes edge-referenced alignment compensation operations, and d) selecting an edge-referenced alignment compensation tool that provides edge-referenced alignment compensation operations that operate in conjunction with the edge feature video tool;
analyzing the image data of at least one workpiece image in the region of interest in order to provide the edge-referenced alignment compensation comprises executing the edge-referenced alignment compensation operations in conjunction with operations of the edge feature video tool.

13. The method of claim 1, wherein the method is performed during a learn mode of the machine vision system and corresponding operations are recorded in a part program.

14. The method of claim 1, wherein at least some steps of the method are performed during a run mode of the machine vision system by executing corresponding operations recorded in a part program.

15. The method of claim 1, wherein providing the edge-referenced alignment compensation comprises characterizing the respective offset amount of the edge feature at respective locations along a default direction associated with the edge feature video tool.

16. The method of claim 15, wherein characterizing the respective offset amount of the edge feature at respective locations along the default direction comprises:
operating the edge feature video tool to acquire a plurality of differently focused images of the region of interest;
determining preliminary profile data for the edge feature based on the acquired plurality of differently focused images of the region of interest;
aligning a line shape associated with the edge feature video tool to the edge feature, based on the preliminary profile data; and characterizing the respective offset amount of the aligned line shape at respective locations along the default direction.

17. The method of claim 16, wherein the line shape associated with the edge feature video tool is a straight line, and characterizing the respective offset amount of the aligned line shape at respective locations along the default direction comprises determining an angle between the aligned straight line and the default direction.

18. The method of claim 16, wherein the line shape associated with the edge feature video tool comprises at least a portion of a circle, the default direction follows a direction parallel to a default circle, and characterizing the respective offset amount of the aligned line shape at respective locations along the default direction comprises determining the respective offset amount of the aligned at least a portion of a circle relative to the default circle.

19. The method of claim 1, wherein the method further comprises:
operating the edge feature video tool to acquire a plurality of differently focused images of the region of interest during a learn mode of the machine vision system;
determining a plurality of representative composite Z height profiles across the edge feature wherein each representative composite Z height profile is based on a corresponding directional filtering direction used for directionally filtering the plurality of differently focused images prior to determining that representative composite Z height profiles;
determining one of the plurality of representative composite Z height profiles that substantially minimizes the respective offset amount of the edge feature at respective locations along a directional filtering direction used for providing that representative composite Z height profile; and
determining the edge-referenced alignment compensation based on the directional filtering direction corresponding to that one of the plurality of representative composite Z height profiles that substantially minimizes the respective offset amount of the edge feature.

20. The method of claim 19, wherein determining one of the plurality of representative composite Z height profiles that substantially minimizes the respective offset amount comprises determining the composite Z height profile that exhibits a maximum profile gradient corresponding to the representative edge feature among the plurality of representative composite Z height profiles.

21. A system for determining profile data for an edge feature, comprising:
a memory for storing programmed instructions;
a processor configured to execute the programmed instructions to perform operations including:
placing a workpiece in a field of view of a machine vision inspection system;
operating an edge feature video tool to define a video tool region of interest including an edge feature in an acquired image of the workpiece; and
operating the edge feature video tool to analyze image data of at least one workpiece image in the region of interest in order to provide an edge-referenced alignment compensation related to substantially minimizing a respective offset amount of the edge feature at respective locations along a directional filtering direction used for directionally filtering a plurality of differently focused images prior to determining the profile data for the edge feature.

22. The system of claim 21, wherein the operations further comprise:
operating the edge feature video tool to acquire the plurality of differently focused images;
applying the edge-referenced alignment compensation to adjust the directional filtering direction;
directionally filtering the plurality of differently focused images after applying the edge referenced alignment compensation, and
determining the profile data for the edge feature based on the directionally filtered plurality of differently focused images.

23. The system of claim 22, wherein:
directionally filtering the plurality of differently focused images comprises using a directional filtering sub region (DFS) defined relative to a point corresponding to a PFF basis pixel location in each of the plurality of images, each DFS having a longer dimension along the directional filtering direction that is greater than a short dimension along a second direction approximately perpendicular to the directional filtering direction; and
the edge-referenced alignment compensation is used to adjust the directional filtering direction such that the offset amount of the edge feature along the directional filtering direction is at least one of a) substantially removed and b) substantially compensated, prior to performing the directional filtering.

24. A non-transitory computer readable storage medium with instruction stored thereon that are executable by a processor to perform operations of:
placing a workpiece in a field of view of a machine vision inspection system;
operating an edge feature video tool to define a video tool region of interest including an edge feature in an acquired image of the workpiece; and
operating the edge feature video tool to analyze image data of at least one workpiece image in the region of interest in order to provide an edge-referenced alignment compensation related to a respective offset amount of the edge feature at respective locations along a directional filtering direction used for directionally filtering a plurality of differently focused images prior to determining the profile data for the edge feature.

25. The computer readable storage medium of claim 24, wherein the operations further comprise:
operating the edge feature video tool to acquire the plurality of differently focused images;
applying the edge-referenced alignment compensation to adjust the directional filtering direction;
directionally filtering the plurality of differently focused images after applying the edge referenced alignment compensation, and
determining the profile data for the edge feature based on the directionally filtered plurality of differently focused images.

26. The computer readable storage medium of claim 25, wherein:
directionally filtering the plurality of differently focused images comprises using a directional filtering sub region (DFS) defined relative to a point corresponding to a PFF basis pixel location in each of the plurality of images, each DFS having a longer dimension along the directional filtering direction that is greater than a short dimension along a second direction approximately perpendicular to the directional filtering direction; and
the edge-referenced alignment compensation is used to adjust the directional filtering direction such that the offset amount of the edge feature along the directional filtering direction is at least one of a) substantially removed and b) substantially compensated, prior to performing the directional filtering.

* * * * *